United States Patent
Mizuno

(10) Patent No.: US 12,519,309 B2
(45) Date of Patent: Jan. 6, 2026

(54) BATTERY-OPERATED DEVICE

(71) Applicant: MAKITA CORPORATION, Anjo (JP)

(72) Inventor: Shunta Mizuno, Anjo (JP)

(73) Assignee: MAKITA CORPORATION, Anjo (JP)

( * ) Notice: Subject to any disclaimer, the term of this patent is extended or adjusted under 35 U.S.C. 154(b) by 255 days.

(21) Appl. No.: 18/180,924

(22) Filed: Mar. 9, 2023

(65) Prior Publication Data

US 2023/0299577 A1 Sep. 21, 2023

(30) Foreign Application Priority Data

Mar. 16, 2022 (JP) .................... 2022-041779

(51) Int. Cl.
*H02J 1/08* (2006.01)
*H02J 1/10* (2006.01)

(52) U.S. Cl.
CPC .............. *H02J 1/084* (2020.01); *H02J 1/108* (2013.01)

(58) Field of Classification Search
CPC ................................ H02J 1/084; H02J 1/108
See application file for complete search history.

(56) References Cited

U.S. PATENT DOCUMENTS

| 5,784,626 A * | 7/1998 | Odaohara | H02J 9/061 713/340 |
| 2018/0215404 A1 | 8/2018 | Hayashi et al. | |
| 2020/0212838 A1* | 7/2020 | Nakamoto | A01D 34/47 |
| 2020/0395778 A1* | 12/2020 | Obie | H02J 1/108 |

FOREIGN PATENT DOCUMENTS

JP 6864488 B2 4/2021

* cited by examiner

*Primary Examiner* — Harry R Behm
(74) *Attorney, Agent, or Firm* — Oliff PLC

(57) ABSTRACT

A battery-operated device in one aspect of the present disclosure includes first to fourth current paths. A first end of the first current path and a first end of the third current path are connected to a first battery. A first end of the second current path and a first end of the fourth current path are connected to a second battery. A second end of the first current path is connected to a second end of the second current path. A second end of the third current path is connected to a second end of the fourth current path. The battery-operated device further includes a first switch on the first current path, a second switch on the second current path, a first rectifier on the third current path, and a fourth rectifier on the fourth current path.

19 Claims, 10 Drawing Sheets

BATTERY-OPERATED DEVICE

CROSS-REFERENCE TO RELATED APPLICATIONS

This application claims the benefit of Japanese Patent Application No. 2022-041779 filed on Mar. 16, 2022 with the Japan Patent Office, the disclosure of which is incorporated herein by reference.

BACKGROUND

The present disclosure relates to a battery-operated device.

Japanese Patent Gazette No. 6864488 discloses an electric wheelbarrow. The electric wheelbarrow includes two or more attachment portions. Two or more battery packs are attachable to the corresponding attachment portions. The electric wheelbarrow includes a power-supply circuit. Each of the two or more battery packs is connected to the power-supply circuit via two or more diodes. Electric power of each battery pack is supplied to the power-supply circuit via the corresponding two or more diodes.

The power-supply circuit generates a power-supply voltage. The power-supply voltage is suppled to a motor, a control system, and peripheral circuits of the control system.

SUMMARY

In the above-described electric wheelbarrow, even when any one of the battery packs is unable to supply electric power, the power-supply circuit can operate. Further, each battery pack is connected to the power-supply circuit via the corresponding diodes. This results in inhibiting an electric current from flowing from one battery pack to another battery pack.

Electric energy consumed by the power-supply circuit is increased as the number of objects to be controlled by the control circuit is increased. Such increase in the electric energy results in increase in the electric current flowing through the diodes. Such increase in the electric current flowing through the diodes may cause heat generation in the diodes, resulting in deterioration of the diodes. For example, heat generation in the diodes can be inhibited by (i) using large-sized diodes or (ii) providing a cooling fan. In such a case, however, the size of the power-supply circuit and/or the battery-operated device becomes larger, thus incurring increase in the costs for the power-supply circuit and/or the battery-operated device.

In one aspect of the present disclosure, it is desirable to reduce an electric current flowing from a battery through a rectifier to a power-supply circuit in a battery-operated device.

A battery-operated device of one aspect of the present disclosure includes first and second attachment portions, a first positive-electrode terminal, a second positive-electrode terminal, first to fourth current paths, a first switch, a second switch, a first power-supply circuit, a second power-supply circuit, a first control circuit, a second control circuit, a first rectifier, and a second rectifier.

The first and second attachment portions are configured to be respectively attached with a first battery pack and a second battery pack in a detachable manner. The first battery pack and the second battery pack respectively include a first battery and a second battery. The first battery and the second battery respectively include a first positive electrode and a second positive electrode.

The first positive-electrode terminal is electrically connected to the first positive electrode of the first battery pack attached to the first attachment portion. The second positive-electrode terminal is electrically connected to the second positive electrode of the second battery pack attached to the second attachment portion.

The first to fourth current paths each include a first end and a second end. The first end of the first current path is electrically connected to the first positive-electrode terminal. The first end of the second current path is electrically connected to the second positive-electrode terminal. The second end of the second current path is electrically connected to the second end of the first current path. The first end of the third current path is electrically connected to the first positive-electrode terminal. The first end of the fourth current path is electrically connected to the second positive-electrode terminal. The second end of the fourth current path is electrically connected to the second end of the third current path.

The first switch is (i) on the first current path and (ii) switched between an ON-state and an OFF-state. The first switch in the ON-state completes the first current path. The first switch in the OFF-state interrupts the first current path.

The second switch is (i) on the second current path and (ii) switched between an ON-state and an OFF-state. The second switch in the ON-state completes the second current path. The second switch in the OFF-state interrupts the second current path.

The first power-supply circuit is electrically connected to the second end of the first current path and to the second end of the second current path. The first power-supply circuit receives (i) a first electric power from the first battery via the first current path or (ii) a second electric power from the second battery via the second current path. The first power-supply circuit (i) generates a first voltage based on the first electric power or the second electric power and (ii) outputs the first voltage. The first electric power may be supplied to the first power-supply circuit via the first current path when the first switch is in the ON-state. The second electric power may be supplied to the first power-supply circuit via the second current path when the second switch is in the ON-state.

The second power-supply circuit is electrically connected to the second end of the third current path and to the second end of the fourth current path. The second power-supply circuit receives (i) a third electric power from the first battery via the third current path or (ii) a fourth electric power from the second battery via the fourth current path. The second power-supply circuit (i) generates a second voltage based on the third electric power or the fourth electric power and (ii) outputs the second voltage.

The first control circuit (i) receives the first voltage from the first power-supply circuit and (ii) operates with the first voltage. The first control circuit may operate when the first switch or the second switch is in the ON-state.

The second control circuit (i) receives the second voltage from the second power-supply circuit and (ii) operates with the second voltage.

The first rectifier is on the third current path. The first rectifier (i) allows a first electric current to flow through the third current path from the first end of the third current path to the second end of the third current path and (ii) inhibits or prevents a second electric current from flowing through the third current path from the second end of the third current path to the first end of the third current path.

The second rectifier is on the fourth current path. The second rectifier (i) allows a third electric current to flow through the fourth current path from the first end of the fourth current path to the second end of the fourth current path and (ii) inhibits or prevents a fourth electric current from flowing through the fourth current path from the second end of the fourth current path to the first end of the fourth current path.

In a case where the first battery pack is attached to the first attachment portion or in a case where the second battery pack is attached to the second attachment portion, the third electric power or the fourth electric power, respectively, is supplied to the second power-supply circuit via the first rectifier or the second rectifier, respectively. Upon receiving the third electric power or the fourth electric power, the second power-supply circuit generates the second voltage.

As described above, the battery-operated device of the present disclosure includes the first and second power-supply circuits. When the first switch or the second switch is in the ON-state, the first power-supply circuit receives the first electric power or the second electric power, respectively, and generates the first voltage.

When power consumption based on the second voltage increases due to, for example, increase in the number of objects to be controlled by the first control circuit, a large electric current may flow through the first current path or the second current path. However, such large electric current may flow when the first switch or the second switch is in the ON-state.

Even when a large electric current flows through the first current path, voltage drop in the first switch (i.e., power consumption in the first switch) is small or very small. Thus, heat generation in the first switch, and deterioration of the first switch resulting from such heat generation, are inhibited.

The second power-supply circuit receives the third electric power or the fourth electric power via the first rectifier or the second rectifier, respectively. When power consumption in the second power-supply circuit increases, a large electric current may flow through the first rectifier or the second rectifier.

However, in the present disclosure, the first power-supply circuit is provided separately from the second power-supply circuit. At least the first control circuit operates with the first voltage from the first power-supply circuit. Thus, the electric power that should be supplied by the second power-supply circuit is reduced. This makes it possible to inhibit increase in the electric current flowing through the first and second rectifiers, thus inhibiting heat generation in the first and second rectifiers.

Consequently, the battery-operated device of the present disclosure can inhibit heat generation in the first and second rectifiers without (i) increasing the sizes of the first and second rectifiers, and/or (ii) providing a cooling fan. This makes it possible to inhibit increase in size and/or cost of the battery-operated device.

Another aspect of the present disclosure provides a method for providing an electric circuit to a battery-operated device, the method including:

providing first to fourth current paths to the battery-operated device, the first to fourth current paths each including a first end and a second end, the first end of the first current path being configured to be electrically connected to a positive electrode of a first battery, the first end of the second current path being configured to be electrically connected to a positive electrode of a second battery, the second end of the second current path being electrically connected to the second end of the first current path, the first end of the third current path being configured to be electrically connected to the positive electrode of the first battery, the first end of the fourth current path being configured to be electrically connected to the positive electrode of the second battery, the second end of the fourth current path being electrically connected to the second end of the third current path;

providing first and second switches on the first and second current paths, respectively, the first and second switches being configured to respectively complete or interrupt the first and second current paths; and providing first and second rectifiers on the third and fourth current paths, respectively, the first rectifier being configured to (i) allow a first electric current to flow through the third current path from the first end of the third current path to the second end of the third current path and (ii) inhibit or prevent a second electric current from flowing through the third current path from the second end of the third current path to the first end of the third current path, the second rectifier being configured to (i) allow a third electric current to flow through the fourth current path from the first end of the fourth current path to the second end of the fourth current path and (ii) inhibit or prevent a fourth electric current from flowing through the fourth current path from the second end of the fourth current path to the first end of the fourth current path.

Such a method makes it possible to inhibit increase in size and/or cost of the battery-operated device.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

1. Overview of Embodiment

Figure 1:
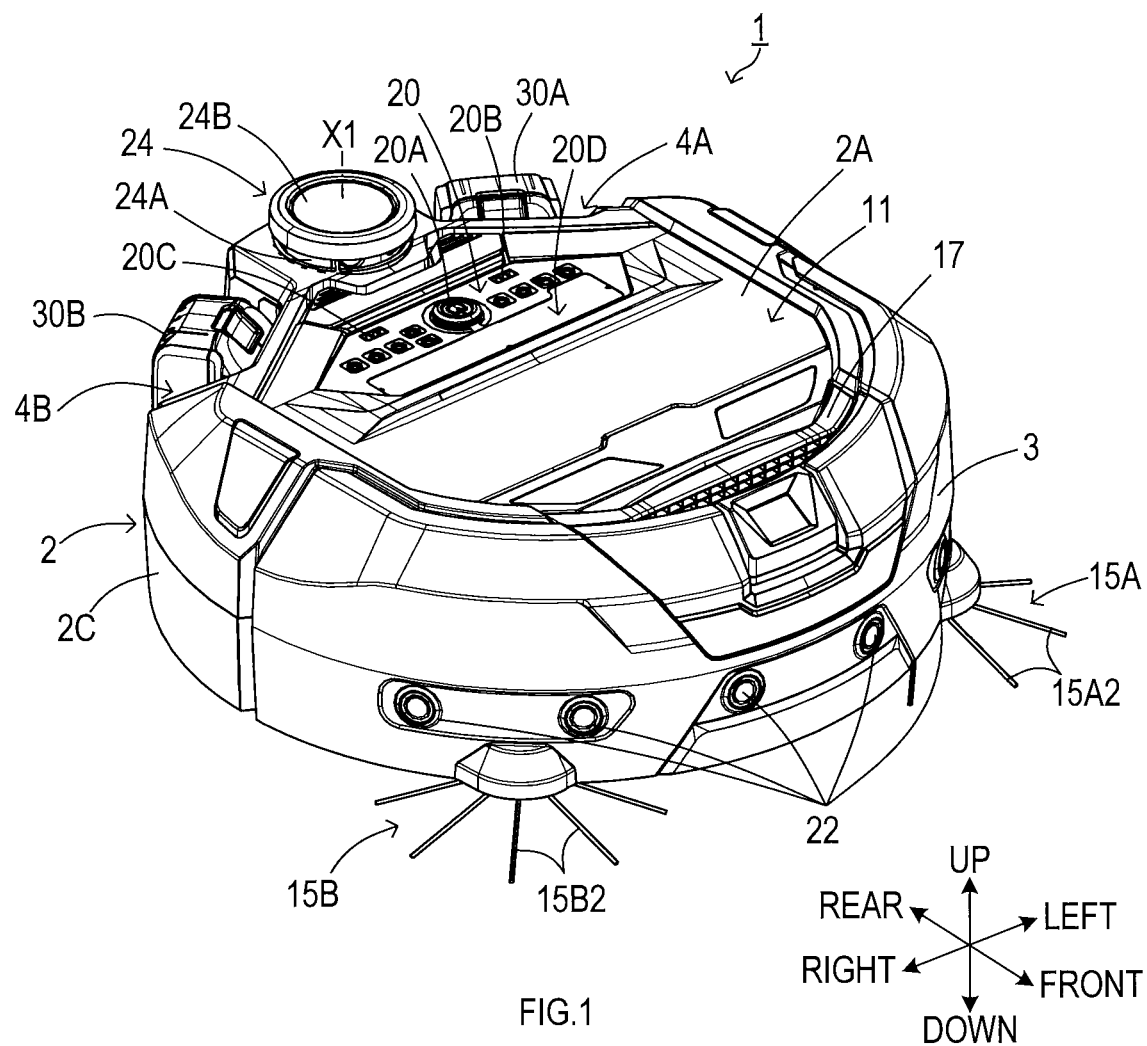
FIG. 1 is a perspective view showing an external appearance of a robot dust collector of an embodiment.

One embodiment may provide a battery-operated device including at least any one of the following Features 1 to 16.

Feature 1: a first attachment portion configured to be attached with a first battery pack in a detachable manner, the first battery pack including a first battery, the first battery including a first positive electrode Feature 2: a second attachment portion configured to be attached with a second battery pack in a detachable manner, the second battery pack including a second battery, the second battery including a second positive electrode Feature 3: a first positive-electrode terminal configured to be electrically connected to the first positive electrode of the first battery pack attached to the first attachment portion Feature 4: a second positive-electrode terminal configured to be electrically connected to the second positive electrode of the second battery pack attached to the second attachment portion Feature 5: a first current path including a first end and a second end, the first end of the first current path being electrically connected to the first positive-electrode terminal Feature 6: a second current path including a first end and a second end, the first end of the second current path being electrically connected to the second positive-electrode terminal, the second end of the second current path being electrically connected to the second end of the first current path Feature 7: a third current path including a first end and a second end, the first end of the third current path being electrically connected to the first positive-electrode terminal Feature 8: a fourth current path including a first end and a second end, the first end of the fourth current path being electrically connected to the second positive-electrode terminal, the second end of the fourth current path being electrically connected to the second end of the third current path Feature 9: a first switch (i) on the first current path and (ii) configured to be switched between an ON-state and an OFF-state, the first switch in the ON-state being configured to complete the first current path, the first switch in the OFF-state being configured to interrupt the first current path Feature 10: a second switch (i) on the second current path and (ii) configured to be switched between an ON-state and an OFF-state, the second switch in the ON-state being configured to complete the second current path, the second switch in the OFF-state being configured to interrupt the second current path Feature 11: a first power-supply circuit electrically connected to the second end of the first current path and to the second end of the second current path, the first power-supply circuit being configured to receive (i) a first electric power from the first battery via the first current path or (ii) a second electric power from the second battery via the second current path, the first power-supply circuit being configured to (i) generate a first voltage based on the first electric power or the second electric power and (ii) output the first voltage Feature 12: a second power-supply circuit electrically connected to the second end of the third current path and to the second end of the fourth current path, the second power-supply circuit being configured to receive (i) a third electric power from the first battery via the third current path or (ii) a fourth electric power from the second battery via the fourth current path, the second power-supply circuit being configured to (i) generate a second voltage based on the third electric power or the fourth electric power and (ii) output the second voltage Feature 13: a first control circuit configured to (i) receive the first voltage from the first power-supply circuit and (ii) operate with the first voltage Feature 14: a second control circuit configured to (i) receive the second voltage from the second power-supply circuit and (ii) operate with the second voltage Feature 15: a first rectifier on the third current path, the first rectifier being configured to (i) allow a first electric current to flow through the third current path from the first end of the third current path to the second end of the third current path and (ii) inhibit or prevent a second electric current from flowing through the third current path from the second end of the third current path to the first end of the third current path Feature 16: a second rectifier on the fourth current path, the second rectifier being configured to (i) allow a third electric current to flow through the fourth current path from the first end of the fourth current path to the second end of the fourth current path and (ii) inhibit or prevent a fourth electric current from flowing through the fourth current path from the second end of the fourth current path to the first end of the fourth current path In the battery-operated device including at least Features 1 to 16, it is possible to inhibit increase in the electric current flowing through the first and second rectifiers and to inhibit heat generation in the first and second rectifiers. Thus, it is possible to (i) inhibit increase in size of the first and second rectifiers and/or (ii) eliminate the necessity of a cooling fan. This makes it possible to inhibit increase in size and/or cost of the battery-operated device.

In addition to or in lieu of at least any one of the above-described Features 1 to 16, one embodiment may include the following Feature 17.

Feature 17: a drive circuit (i) electrically connected to the second end of the first current path and to the second end of the second current path and (ii) configured to drive an electric load (or a driven object)

The drive circuit may be configured to (i) receive a fifth electric power from the first battery via the first current path or (ii) receive a sixth electric power from the second battery via the second current path. The drive circuit may be configured to operate with the fifth electric power or the sixth electric power. The electric load may include an actuator.

In addition to or in lieu of at least any one of the above-described Features 1 to 17, one embodiment may include the following Feature 18.

Feature 18: the first control circuit is configured to control the electric load via the drive circuit The first control circuit may directly control the drive circuit. The drive circuit may drive the electric load in accordance with control by the first control circuit.

In addition to or in lieu of at least any one of the above-described Features 1 to 18, one embodiment may include the following Feature 19.

Feature 19: the electric load includes a motor configured to drive a tool

In addition to or in lieu of at least any one of the above-described Features 1 to 19, one embodiment may include at least any one of the following Features 20 and 21.

Feature 20: the second control circuit is electrically connected to the first switch and to the second switch Feature 21: the second control circuit is configured to individually switch the first switch and the second switch to the ON-state or to the OFF-state In the battery-operated device including at least Features 1 to 16, 20, and 21, power consumption in the second power-supply circuit does not change or hardly changes according to the operation of the first control circuit and/or the drive circuit. This results in inhibiting or preventing increase in heat generation in the first rectifier or the second rectifier due to the operation of the first control circuit and/or the drive circuit.

In addition to or in lieu of at least any one of the above-described Features 1 to 21, one embodiment may include at least any one of the following Features 22 and 23.

Feature 22: a third rectifier on the first current path, the third rectifier being configured to (i) allow a fifth electric current to flow through the first current path from the first end of the first current path to the second end of the first current path via the third rectifier and (ii) inhibit or prevent a sixth electric current from flowing through the first current path from the second end of the first current path to the first end of the first current path via the third rectifier Feature 23: a fourth rectifier on the second current path, the fourth rectifier being configured to (i) allow a seventh electric current to flow through the second current path from the first end of the second current path to the second end of the second current path via the fourth rectifier and (ii) inhibit or prevent an eighth electric current from flowing through the second current path from the second end of the second current path to the first end of the second current path via the fourth rectifier The third rectifier may be arranged in series on the first current path. The fourth rectifier may be arranged in series on the second current path.

In addition to or in lieu of at least any one of the above-described Features 1 to 23, one embodiment may include at least any one of the following Features 24 and 25.

Feature 24: a third switch (i) electrically connected to the first current path so as to bypass the third rectifier and (ii) configured to be switched between an ON-state and an OFF-state, the third switch in the ON-state being configured to allow the fifth electric current to flow through the third switch, the third switch in the OFF-state being configured to inhibit or prevent the sixth electric current from flowing through the third switch Feature 25: a fourth switch (i) electrically connected to the second current path so as to bypass the fourth rectifier and (ii) configured to be switched between an ON-state and an OFF-state, the fourth switch in the ON-state being configured to allow the seventh electric current to flow through the fourth switch, the fourth switch in the OFF-state being configured to inhibit or prevent the eighth electric current from flowing through the fourth switch The third switch may be connected in parallel with the third rectifier. The fourth switch may be connected in parallel with the fourth rectifier.

In the battery-operated device including at least Features 1 to 16 and 22 to 25, it is possible to (i) inhibit a charging current from flowing from the first battery pack to the second battery pack and (ii) inhibit a charging current from flowing from the second battery pack to the first battery pack.

Here, a path through which the first electric power or the second electric power is supplied to the first power-supply circuit is referred to as a discharge path. Further, a load configured to receive the electric power from the first battery or the second battery via the discharge path is referred to as a first load. The first load includes the first power-supply circuit. In the case where the battery-operated device includes the drive circuit, (i) the first load may include the drive circuit, and (ii) the fifth electric power or the sixth electric power may be supplied to the drive circuit via the discharge path.

Switching of the discharge path may be performed while power supply to the first load is continued. The switching of the discharge path refers to switching the discharge path (i) from the first current path to the second current path or (ii) from the second current path to the first current path.

When the switching of the discharge path is performed, both of the first switch and the second switch may be temporarily in the ON-state. In this case, it is possible to switch the discharge path while continuing power supply to the first load. In this case, however, the charging current may flow (i) from the first battery pack to the second battery pack or (ii) from the second battery pack to the first battery pack.

Assuming that the first current path is currently set as the discharge path, the discharge path may be switched to the second current path in response to decrease in the remaining energy of the first battery. The remaining energy refers to an amount of the remaining electric power that the first battery can discharge. The switching of the discharge path may be performed by the first control circuit. Switching of the discharge path from the first current path to the second current path may be performed in a situation in which the remaining energy of the first battery is less than the remaining energy of the second battery.

In this situation, if both of the first switch and the second switch are in the ON-state, the charging current flows from the second battery to the first battery. This may cause deterioration of the first battery pack and/or the second battery pack.

In this case, however, if the battery-operated device includes the third rectifier, the charging current can be inhibited from flowing from the second battery to the first battery.

When switching the discharge path from the second current path to the first current path, the charging current may flow from the first battery pack to the second battery pack. However, if the battery-operated device includes the fourth rectifier, the charging current can be inhibited from flowing from the first battery pack to the second battery pack.

In a case where (i) the first current path is set as the discharge path and (ii) the third switch is not provided, the electric current may continuously flow to the first load via the third rectifier.

In contrast, in a case where (i) the third switch is provided and (ii) the third switch is switched to the ON-state in a first state, the electric current is inhibited or prevented from flowing through the third rectifier. The first state corresponds to a state in which the first current path is maintained as the discharge path and in which the switching of the discharge path is not performed (or the switching is not necessary).

The third switch may be switched to the OFF-state when switching the discharge path from the first current path to the second current path. As a result, the electric current can be inhibited from continuing to flow through the third rectifier at the time of power supply to the first load, thus inhibiting heat generation and deterioration of the third rectifier.

In a case where (i) the second current path is set as the discharge path and (ii) the fourth switch is not provided, the electric current may continuously flow to the first load via the fourth rectifier. In this case, however, if the fourth switch is provided, similar effects to those in the case where the first current path is set as the discharge path can be obtained. Specifically, the electric current can be inhibited from continuing to flow through the fourth rectifier at the time of power supply to the first load via the second current path, thus inhibiting heat generation and deterioration of the fourth rectifier.

In addition to or in lieu of at least any one of the above-described Features 1 to 25, one embodiment may include at least any one of the following Features 26 to 29.

Feature 26: the second control circuit is electrically connected to the first to fourth switches Feature 27: the second control circuit (i) switches the first switch and the third switch to their respective ON-states and (ii) switches the second switch and the fourth switch to their respective OFF-states, to thereby set the battery-operated device to a first steady state Feature 28: the second control circuit switches the third switch to the OFF-state based on the battery-operated device being in the first steady state, to thereby set the battery-operated device to a first transient state Feature 29: the second control circuit switches the second switch to the ON-state based on the battery-operated device being in the first transient state, to thereby set the battery-operated device to a second transient state In the first steady state, the first power-supply circuit may receive the first electric power from the first battery pack. In the first steady state, further, the drive circuit may operate by receiving the electric power from the first battery pack.

In the battery-operated device including at least Features 1 to 16 and 22 to 29, in the second transient state, the charging current is inhibited or prevented from flowing from the second battery pack to the first battery pack by the third switch (or by the third switch and the third rectifier).

In addition to or in lieu of at least any one of the above-described Features 1 to 29, one embodiment may include at least any one of the following Features 30 and 31.

Feature 30: the second control circuit is configured to set the battery-operated device to the first transient state based on (i) the battery-operated device being in the first steady state and (ii) a switching requirement having been satisfied or being satisfied Feature 31: the switching requirement is required for supplying the second electric power to the first power-supply circuit, In addition to or in lieu of at least any one of the above-described Features 1 to 31, one embodiment may include the following Feature 32.

Feature 32: the second control circuit is configured, based on the battery-operated device being in the second transient state, to (i) switch the first switch to the OFF-state and (ii) switch the fourth switch to the ON-state, to thereby set the battery-operated device to a second steady state In the battery-operated device including at least Features 1-16, 22-29, and 32, the discharge path can be switched from the first current path to the second current path. Moreover, switching the fourth switch to the ON-state results in inhibiting the electric current from continuing to flow through the fourth rectifier.

In Feature 32, switching the first switch to OFF-state may be performed concurrently with switching the fourth switch to the ON-state. Alternatively, the first switch may be switched to the OFF-state after the fourth switch is switched to the ON-state. Alternatively, the fourth switch may be switched to the ON-state after the first switch is switched to the OFF-state.

In addition to or in lieu of at least any one of the above-described Features 1 to 32, one embodiment may include at least any one of the following Features 33 to 37.

Feature 33: the second control circuit is configured to output a first OFF signal to the third switch Feature 34: the third switch is configured to be switched to the OFF-state based on the third switch having received the first OFF signal Feature 35: the second control circuit is configured to perform a first diagnosis (or a first failure determination)

Feature 36: the first diagnosis includes acquiring a magnitude of a third voltage across the third switch based on the first OFF signal having been output or being output to the third switch Feature 37: the first diagnosis includes performing a first operation based on the magnitude of the third voltage acquired The battery-operated device may further include a voltage detection circuit. The voltage detection circuit may detect the third voltage. The second control circuit may acquire the magnitude of the third voltage based on the detected third voltage, when the first switch is in the ON-state and the third switch is in the OFF-state. The second control circuit may determine whether the third switch or the third rectifier is in failure based on the magnitude of the third voltage.

When the first switch is in the ON-state and the third switch is in the OFF-state, a first forward current may flow through the third rectifier. This first forward current causes a first voltage drop in the third rectifier.

If the magnitude of the third voltage corresponds to the magnitude of the first voltage drop, it may be determined that the third switch and the third rectifier are normal (or proper).

If the magnitude of the third voltage does not correspond to the magnitude of the first voltage drop, it may be determined that the third switch or the third rectifier is in failure (or faulty).

In addition to or in lieu of at least any one of the above-described Features 1 to 37, one embodiment may include at least any one of the following Features 38 and 39.

Feature 38: the battery-operated device further includes a drive circuit (i) electrically connected to the second end of the first current path and to the second end of the second current path and (ii) configured to drive an electric load Feature 39: the first operation includes limiting or stopping driving of the electric load by the drive circuit based on the magnitude of the third voltage being smaller than a first threshold The first threshold may be determined based on the magnitude of the first voltage drop in the third rectifier. The first threshold may be equal to the magnitude of the first voltage drop. The first threshold may be smaller than the magnitude of the first voltage drop and greater than zero.

If the magnitude of the third voltage is smaller than the first threshold, the third switch or the third rectifier may be in failure. In other words, the first current path may be in failure. In this case, control of the electric load by the drive circuit may be limited.

In addition to or in lieu of at least any one of the above-described Features 1 to 39, one embodiment may include at least any one of the following Features 40 and 41.

Feature 40: the first control circuit is configured to control the electric load via the drive circuit Feature 41: the first operation includes commanding the first control circuit to limit or stop driving of the electric load based on the magnitude of the third voltage being smaller than the first threshold In addition to or in lieu of at least any one of the above-described Features 1 to 41, one embodiment may include at least any one of the following Features 42 and 43.

Feature 42: the second control circuit is configured to perform the first diagnosis during a period when the battery-operated device is in the first steady state Feature 43: the first diagnosis includes outputting the first OFF signal to the third switch In addition to or in lieu of at least any one of the above-described Features 1 to 43, one embodiment may include at least any one of the following Features 44 and 45.

Feature 44: the first diagnosis further includes outputting a first ON signal to the third switch based on the magnitude of the third voltage having been acquired Feature 45: the third switch is configured to be switched to the ON-state based on the third switch having received the first ON signal In addition to or in lieu of at least any one of the above-described Features 1 to 45, one embodiment may include at least any one of the following Features 46 to 50.

Feature 46: the second control circuit is configured to output a second OFF signal to the fourth switch Feature 47: the fourth switch is configured to be switched to the OFF-state based on the fourth switch having received the second OFF signal Feature 48: the second control circuit is configured to perform a second diagnosis (or a second failure determination)

Feature 49: the second diagnosis includes acquiring a magnitude of a fourth voltage across the fourth switch based on the second OFF signal having been output or being output to the fourth switch Feature 50: the second diagnosis includes performing a second operation based on the magnitude of the fourth voltage acquired The second diagnosis may include determining a failure in the fourth switch or the fourth rectifier. The second control circuit may perform the second diagnosis when switching the discharge path from the first current path to the second current path. More specifically, the second control circuit may perform the second diagnosis during a period when the battery-operated device is in the second transient state.

The voltage detection circuit may detect the fourth voltage. Alternatively, the battery-operated device may include a detection circuit configured to detect the fourth voltage, separately from the voltage detection circuit. The second control circuit may acquire the magnitude of the fourth voltage based on the detected fourth voltage. The second control circuit may determine whether the fourth switch or the fourth rectifier is in failure based on the magnitude of the fourth voltage.

When the second switch is in the ON-state and the fourth switch is in the OFF-state, a second forward current may flow through the fourth rectifier. This second forward current causes a second voltage drop in the fourth rectifier. If the magnitude of the fourth voltage corresponds to the magnitude of the second voltage drop, it may be determined that the fourth switch and the fourth rectifier are normal. If the magnitude of the fourth voltage does not correspond to the magnitude of the second voltage drop, it may be determined that the fourth switch or the fourth rectifier is in failure.

In addition to or in lieu of at least any one of the above-described Features 1 to 50, one embodiment may include the following Feature 51.

Feature 51: the second operation includes limiting or stopping driving of the electric load by the drive circuit based on the magnitude of the fourth voltage being smaller than a second threshold The second threshold may be determined based on the magnitude of the second voltage drop in the fourth rectifier. The second threshold may be equal to the magnitude of the second voltage drop. The second threshold may be smaller than the magnitude of the second voltage drop and greater than zero.

If the magnitude of the fourth voltage is smaller than the second threshold, the fourth switch or the fourth rectifier may be in failure. In other words, the second current path may be in failure. In this case, control of the electric load by the drive circuit may be limited.

In addition to or in lieu of at least any one of the above-described Features 1 to 51, one embodiment may include the following Feature 52.

Feature 52: the second operation includes commanding the first control circuit to limit or stop driving of the electric load based on the magnitude of the fourth voltage being smaller than the second threshold In addition to or in lieu of at least any one of the above-described Features 1 to 52, one embodiment may include the following Feature 53.

Feature 53: the second control circuit is configured to perform the second diagnosis during a period when the battery-operated device is in the second transient state In addition to or in lieu of at least any one of the above-described Features 1 to 53, one embodiment may include at least any one of the following Features 54 and 55.

Feature 54: the first switch is a field-effect transistor

Feature 55: the second switch is a field-effect transistor

In addition to or in lieu of at least any one of the above-described Features 1 to 55, one embodiment may include at least any one of the following Features 56 and 57.

Feature 56: the first switch includes a first body diode, and the first body diode includes a cathode electrically connected to the first positive-electrode terminal Feature 57: the second switch includes a second body diode, and the second body diode includes a cathode electrically connected to the second positive-electrode terminal The first body diode may inhibit or prevent an electric current from flowing from the first battery pack to the second end of the first current path. The second body diode may inhibit or prevent an electric current from flowing from the second battery pack to the second end of the second current path.

In addition to or in lieu of at least any one of the above-described Features 1 to 57, one embodiment may include at least any one of the following Features 58 and 59.

Feature 58: the third switch is a field-effect transistor

Feature 59: the fourth switch is a field-effect transistor

In addition to or in lieu of at least any one of the above-described Features 1 to 59, one embodiment may include at least any one of the following Features 60 to 63.

Feature 60: the third switch includes a third body diode

Feature 61: the third body diode corresponds to the third rectifier

Feature 62: the fourth switch includes a fourth body diode

Feature 63: the fourth body diode corresponds to the fourth rectifier

One embodiment may provide a method for providing an electric circuit to a battery-operated device, which method includes at least any one of the following Features 64 to 71.

Feature 64: providing a first current path to the battery-operated device, the first current path including a first end and a second end, the first end of the first current path being configured to be electrically connected to a positive electrode of a first battery Feature 65: providing a second current path to the battery-operated device, the second current path including a first end and a second end, the first end of the second current path being configured to be electrically connected to a positive electrode of a second battery, the second end of the second current path being electrically connected to the second end of the first current path Feature 66: providing a third current path to the battery-operated device, the third current path including a first end and a second end, the first end of the third current path being configured to be electrically connected to the positive electrode of the first battery Feature 67: providing a fourth current path to the battery-operated device, the fourth current path including a first end and a second end, the first end of the fourth current path being configured to be electrically connected to the positive electrode of the second battery, the second end of the fourth current path being electrically connected to the second end of the third current path Feature 68: providing a first switch on the first current path, the first switch being configured to complete or interrupt the first current path Feature 69: providing a second switch on the second current path, the second switch being configured to complete or interrupt the second current path Feature 70: providing a first rectifier on the third current path, the first rectifier being configured to (i) allow a first electric current to flow through the third current path from the first end of the third current path to the second end of the third current path and (ii) inhibit or prevent a second electric current from flowing through the third current path from the second end of the third current path to the first end of the third current path Feature 71: providing a second rectifier on the fourth current path, the second rectifier being configured to (i) allow a third electric current to flow through the fourth current path from the first end of the fourth current path to the second end of the fourth current path and (ii) inhibit or prevent a fourth electric current from flowing through the fourth current path from the second end of the fourth current path to the first end of the fourth current path The method including Features 64 to 71 makes it possible to inhibit increase in the electric current flowing through the first and second rectifiers and to inhibit heat generation in the first and second rectifiers.

In one embodiment, the above-described Features 1 to 71 may be combined in any combination.

In one embodiment, any of the above-described Features 1 to 71 may be excluded.

2. Specific Example Embodiment

A specific example embodiment will be described below. This specific example embodiment is just one example, and the present disclosure can be practiced in any modes without being limited to this embodiment.

2-1. Rough Structure

Figure 2:
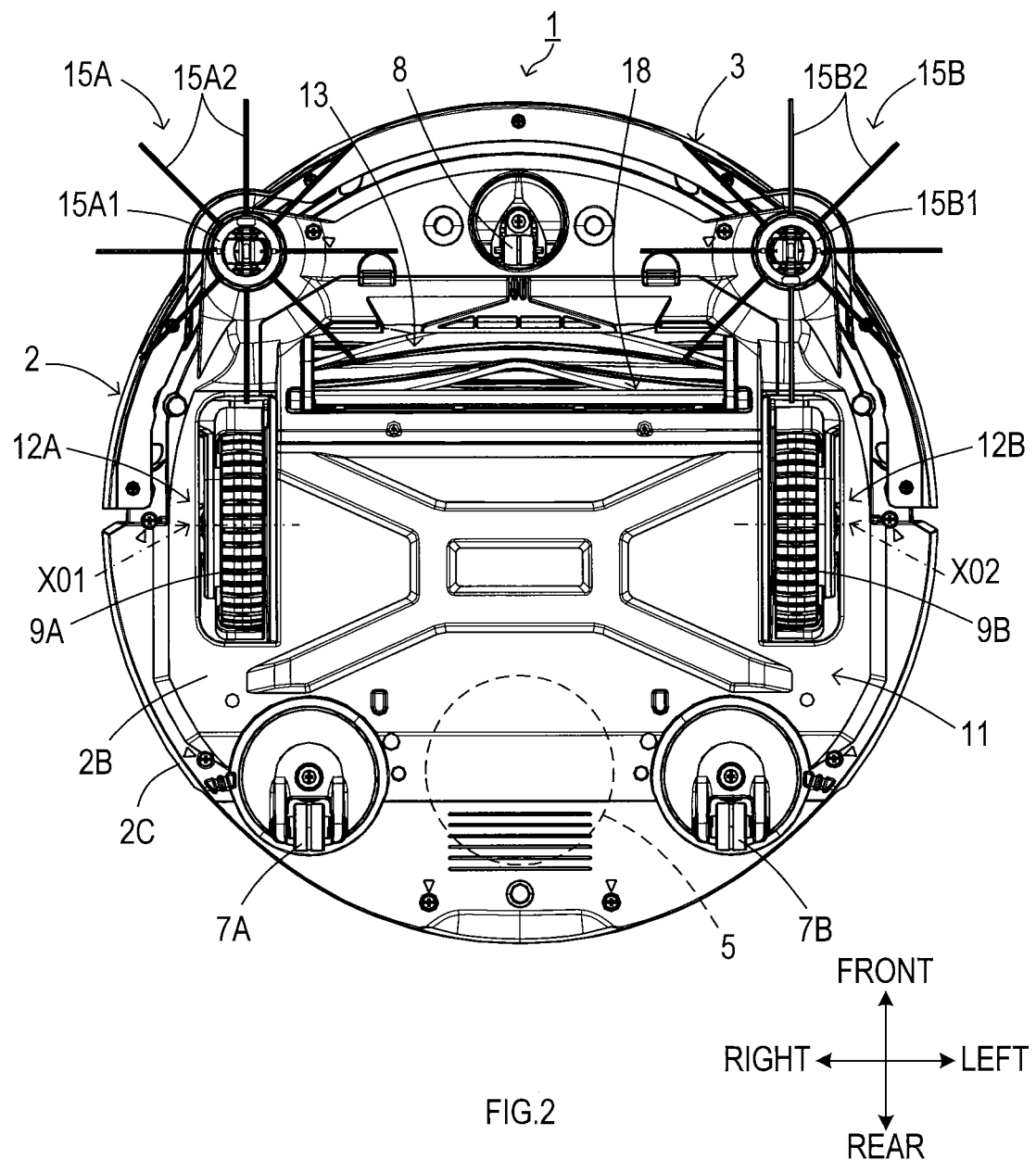
FIG. 2 is a plan view of the robot dust collector in FIG. 1 as viewed from a back side.

As shown in FIGS. 1 and 2, the present embodiment illustrates a robot dust collector (hereinafter simply referred to as a "dust collector") 1. Two or more battery packs can be attached to the dust collector 1. The dust collector 1 can collect (or suction) dust, dirt, and the like, while autonomously running on a surface to be cleaned (a floor, for example, and hereinafter referred to as a "cleaning surface"). The thus-configured dust collector 1 may be referred to as, for example, a robotic cleaner or a robotic dust collector.

As shown in FIGS. 1 and 2, the dust collector 1 includes a body 2.

The body 2 includes an upper surface 2A, a bottom surface 2B, and a side surface 2C. The bottom surface 2B faces the cleaning surface. The side surface 2C ranges from a peripheral edge of the upper surface 2A to a peripheral edge of the bottom surface 2B. The upper surface 2A has a substantially circular shape. The body 2 has a substantially cylindrical shape.

The body 2 includes a housing 11 with an internal space. A surface of the housing 11 includes at least part of the upper surface 2A and at least part of the bottom surface 2B. The bottom surface 2B is provided with a suction port 18. The suction port 18 has a shape of a rectangle extending in left-right directions. Dust on the cleaning surface is suctioned through the suction port 18. The suction port 18 is arranged in a front part of the bottom surface 2B.

The dust collector 1 includes a bumper 3. The bumper 3 is supported by the body 2. The bumper 3 is arranged on a front side of the side surface 2C so as to face the side surface 2C. The bumper 3 is movable while facing the side surface 2C. Thus, when the bumper 3 collides with an object present around the dust collector 1, the bumper 3 is moved toward the body 2, thus reducing impact acting on the body 2.

The dust collector 1 includes a first attachment portion 4A and a second attachment portion 4B. Detachably attached to the first attachment portion 4A is a first battery pack 30A. Detachably attached to the second attachment portion 4B is a second battery pack 30B.

Figure 3:
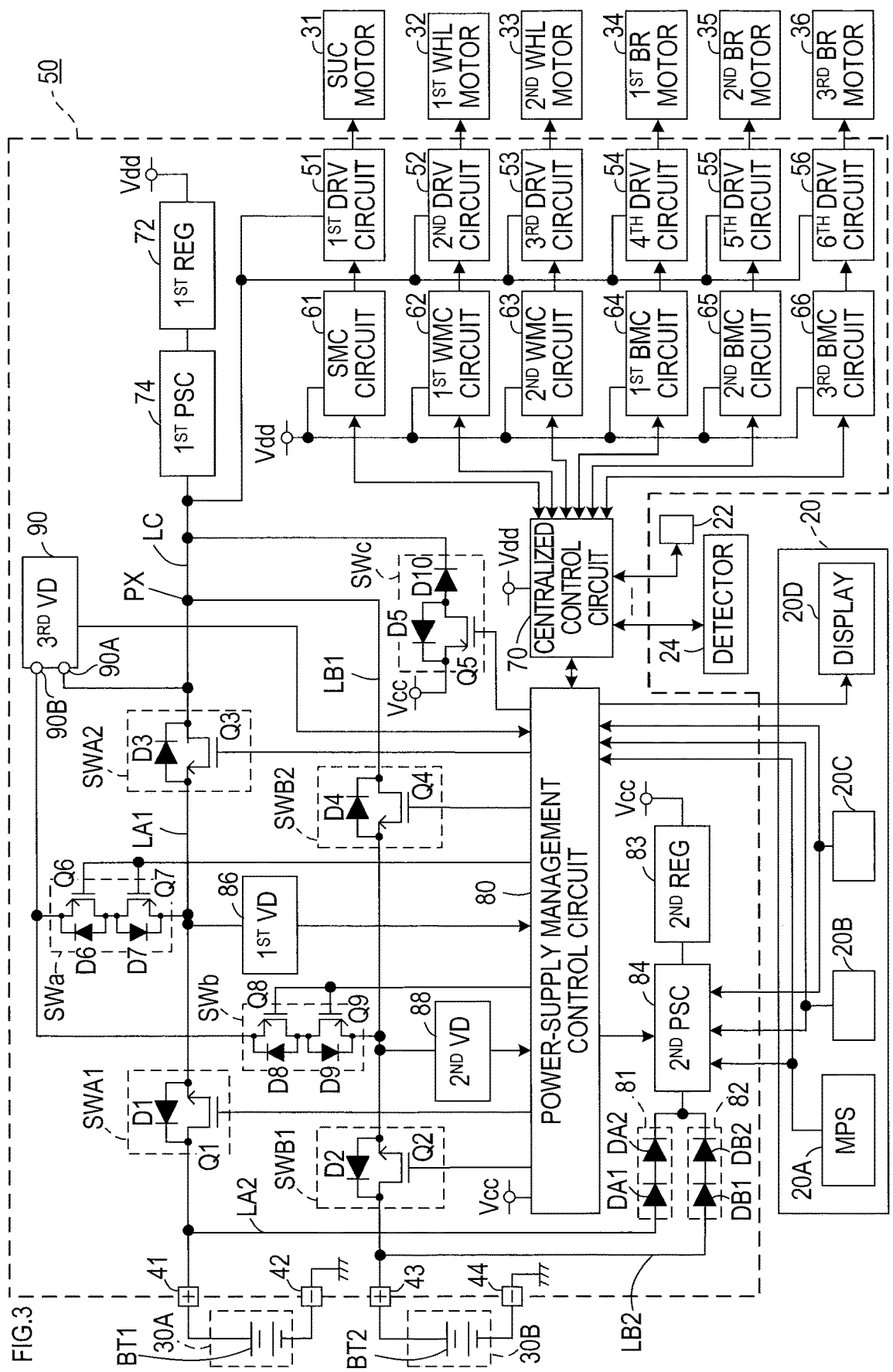
FIG. 3 is a block diagram showing a circuit configuration of the robot dust collector.

The first attachment portion 4A includes a first positive-electrode terminal 41 (see FIG. 3) and a first negative-electrode terminal 42 (see FIG. 3). The first positive-electrode terminal 41 and the first negative-electrode terminal 42 receives a first electric power from the first battery pack 30A attached to the first attachment portion 4A. The first electric power is supplied to the dust collector 1 via the first positive-electrode terminal 41 and the first negative-electrode terminal 42.

The second attachment portion 4B includes a second positive-electrode terminal 43 (see FIG. 3) and a second negative-electrode terminal 44 (see FIG. 3). The second positive-electrode terminal 43 and the second negative-electrode terminal 44 receive a second electric power from the second battery pack 30B attached to the second attachment portion 4B. The second electric power is supplied to the dust collector 1 via the second positive-electrode terminal 43 and the second negative-electrode terminal 44.

The first and second attachment portions 4A and 4B are arranged on a rear part of the body 2. The dust collector 1 can operate by receiving the first electric power or the second electric power.

The first battery pack 30A contains a first battery BT1 (see FIG. 3). The first battery BT1 includes a first positive electrode and a first negative electrode. The second battery pack 30B contains a second battery BT2 (see FIG. 3). The second battery BT2 includes a second positive electrode and a second negative electrode. In the present embodiment, each of the first and second batteries BT1 and BT2 is a rechargeable battery (e.g., a lithium-ion battery). When the first battery pack 30A is attached to the first attachment portion 4A, the first positive electrode is electrically connected to the first positive-electrode terminal 41, and the first negative electrode is electrically connected to the first negative-electrode terminal 42. This results in supplying the first electric power to the dust collector 1. When the second battery pack 30B is attached to the second attachment portion 4B, the second positive electrode is electrically connected to the second positive-electrode terminal 43, and the second negative electrode is electrically connected to the second negative-electrode terminal 44. This results in supplying the second electric power to the dust collector 1. The first battery pack 30A may be attachable to the second attachment portion 4B. The second battery pack 30B may be attachable to the first attachment portion 4A. Each of the first and second battery packs 30A and 30B can also be used as a power supply for other battery-operated device (e.g., an electric power tool) than the dust collector 1.

The dust collector 1 includes a suction fan 5. The suction fan 5 is arranged in the internal space of the housing 11. Further provided in the internal space of the housing 11 is a suction motor 31 (see FIG. 3). The suction motor 31 rotates the suction fan 5. When the suction motor 31 is driven, the suction fan 5 is rotated, thus generating a suction force for suctioning dust, at the suction port 18.

The dust collector 1 includes a first caster 7A, a second caster 7B, and a roller 8. The first and second casters 7A and 7B, and the roller 8 (i) are rotatably provided to the bottom surface 2B and (ii) support the body 2 in a manner allowing the body 2 to be movable. The first and second casters 7A and 7B are arranged on a rear part of the bottom surface 2B. The roller 8 is arranged on a front part of the bottom surface 2B.

The dust collector 1 includes a first running device 12A and a second running device 12B. The first running device 12A includes a first wheel 9A. The second running device 12B includes a second wheel 9B. The first and second wheels 9A and 9B are rotatably provided to the bottom surface 2B. More specifically, the first and second wheels 9A and 9B are arranged so as to be both in a substantially central part of the bottom surface 2B as viewed in front-rear directions, and so as to be spaced apart from each other in the left-right directions. The first wheel 9A rotates about a first rotation axis X01. The second wheel 9B rotates about a second rotation axis X02. In the present embodiment, the first and second rotation axes X01 and X02 are coaxial with each other.

Each of the first and second wheels 9A and 9B partially protrudes downward from the bottom surface 2B. Thus, a tread (or an outer peripheral surface) of each of the first and second wheels 9A and 9B comes in contact with the cleaning surface. When the first wheel 9A and/or the second wheel 9B rotate(s), the body 2 moves in the front-rear directions.

Further provided in the internal space of the housing 11 are a first wheel motor 32 (see FIG. 3) and a second wheel motor 33 (see FIG. 3). The first wheel motor 32 rotates the first wheel 9A. The second wheel motor 33 rotates the second wheel 9B. When at least one of the first wheel motor 32 or the second wheel motor 33 is driven, a corresponding one or both of the first and second wheels 9A and 9B rotate(s), thus allowing the dust collector 1 to run autonomously.

The first and second wheel motors 32 and 33 are controlled individually. Thus, directions of rotation of the first and second wheels 9A and 9B can be changed individually.

Moreover, the first and second wheels 9A and 9B each can be driven with a mutually different drive amount (e.g., at a mutually different rotation speed). When the first and second wheels 9A and 9B are each driven with a mutually different drive amount, the dust collector 1 makes a circling movement.

The dust collector 1 includes a main brush 13. The main brush 13 is provided to the suction port 18 so as to face the cleaning surface. The main brush 13 is rotatably supported by the body 2. The main brush 13 is rotatable about a rotation axis extending in the left-right directions of the suction port 18. At least part of the main brush 13 protrudes downward from the bottom surface 2B. Thus, in a state in which the dust collector 1 is placed on the cleaning surface (i.e., in a state in which the first and second wheels 9A and 9B are in contact with the cleaning surface), the main brush 13 is in contact with the cleaning surface.

Further provided in the internal space of the housing 11 is a first brushing motor 34 (see FIG. 3). The first brushing motor 34 rotates the main brush 13. When the suction motor 31 is driven and the main brush 13 is rotated, dust on the cleaning surface is stirred up by the main brush 13 and then suctioned through the suction port 18.

The dust collector 1 includes a first side brush 15A and a second side brush 15B. The first and second side brushes 15A and 15B are provided to a front part of the bottom surface 2B so as to face the cleaning surface. The first and second side brushes 15A and 15B are arranged so as to be spaced apart from each other in the left-right directions. The first side brush 15A includes a first circular plate member 15A1 and two or more first brushes 15A2. The second side brush 15B includes a second circular plate member 15B1 and two or more second brushes 15B2. The two or more first brushes 15A2 are arranged along a circumference of the first circular plate member 15A1. The two or more second brushes 15B2 are arranged along a circumference of the second circular plate member 15B1.

The first circular plate member 15A1 is rotatable about a third rotation axis (not shown) parallel to a vertical direction of the body 2. The second circular plate member 15B1 is rotatable about a fourth rotation axis (not shown) parallel to the vertical direction of the body 2. Some of the two or more first brushes 15A2 protrude outside the side surface 2C. Similarly, some of the two or more second brushes 15B2 also protrude outside the side surface 2C. When the dust collector 1 is placed on the cleaning surface, each of the two or more first brushes 15A2 and each of the two or more second brushes 15B2 are at least partially in contact with the cleaning surface.

Further provided in the internal space of the housing 11 is a second brushing motor 35 (see FIG. 3) and a third brushing motor 36 (see FIG. 3). The first and second side brushes 15A and 15B are respectively rotated by the second and third brushing motors 35 and 36. When the first and second side brushes 15A and 15B are rotated, dust around the body 2 can be moved to the suction port 18 or to the vicinity thereof by the first and second side brushes 15A and 15B.

The dust collector 1 includes a handle 17. The handle 17 is arranged on a front part of the upper surface 2A. Two ends of the handle 17 are pivotably coupled to the housing 11. A user of the dust collector 1 can lift up the dust collector 1 or carry about the dust collector 1 while gripping the handle 17.

The body 2 is provided with an interfacing device 20. The interfacing device 20 is arranged on a rear part of the upper surface 2A. The interfacing device 20 includes two or more operation parts to be manually operated (or shifted) by the user of the dust collector 1. The two or more operation parts include a main power switch 20A, a first remaining-energy display switch 20B, and a second remaining-energy display switch 20C. The interfacing device 20 further includes a display 20D. The display 20D displays a first remaining energy of the first battery pack 30A, a second remaining energy of the second battery pack 30B, or other information. To be more specific, the first remaining energy corresponds to a remaining energy (i.e., a charging amount) of the first battery BT1, and the second remaining energy corresponds to a remaining energy of the second battery BT2.

When the first remaining-energy display switch 20B is manually operated, the first remaining energy is displayed on the display 20D. When the second remaining-energy display switch 20C is manually operated, the second remaining energy is displayed on the display 20D.

The body 2 is provided with two or more obstacle sensors 22. In the present embodiment, the two or more obstacle sensors 22 are, for example, six in number. The two or more obstacle sensors 22 detect an object present at least partially around the dust collector 1 in a non-contact manner. The two or more obstacle sensors 22 include ultrasonic sensors. Each ultrasonic sensor emits ultrasonic waves to around the ultrasonic sensors. Further, the ultrasonic sensor receives reflected waves generated by reflection of the emitted ultrasonic waves on the object. The ultrasonic sensor detects the object based on the emitted ultrasonic waves and the reflected waves thereof. The two or more obstacle sensors 22 are arranged on the side surface 2C at intervals from each other.

The body 2 is provided with a detector 24. The detector 24 is arranged on a part more rearward than the interfacing device 20 on the upper surface 2A. The detector 24 includes an optical sensor 24A and a cover member 24B. The optical sensor 24A rotates about a fifth rotation axis X1 parallel to the vertical direction of the body 2. The cover member 24B covers at least part of the optical sensor 24A, thus protecting the optical sensor 24A.

The optical sensor 24A emits a detecting light to detect an object around the body 2 in a non-contact manner. The optical sensor 24A of the present embodiment includes a laser sensor. The laser sensor emits a laser light and receives reflected waves thereof, thus detecting the object.

The detector 24 emits the detecting light while rotating the optical sensor 24A. Thus, the detecting light is emitted to a region at a specific height above the body 2 and substantially all around the body 2. The detector 24 detects the object present around the dust collector 1 and the distance to the object based on the detecting light.

The optical sensor 24A may include an infrared sensor or a radar sensor. The infrared sensor detects the object by emitting an infrared light. The radar sensor detects the object by emitting radio waves.

Further provided in the internal space of the housing 11 is a control system 50 (see FIG. 3). The interfacing device 20, the two or more obstacle sensors 22, and the detector 24 are electrically connected to the control system 50. The control system 50 controls the suction motor 31, the first and second wheel motors 32 and 33, and the first to third brushing motors 34 to 36 individually.

The control system 50 controls the first and second wheel motors 32 and 33 based on first detection data and/or second detection data so that the body 2 or the bumper 3 does not come in contact with the object, thus allowing the dust collector 1 to run autonomously. The first detection data indicates the result of detection of the object by the two or more obstacle sensors 22. The second detection data indicates the result of detection of the object by the detector 24. When the body 2 or the bumper 3 comes in contact with the object, the control system 50 controls the first and second wheel motors 32 and 33 to change a running direction of the dust collector 1 or stop the dust collector 1.

While autonomous running of the dust collector 1, the control system 50 controls the suction motor 31 and the first to third brushing motors 34 to 36 to rotate the suction fan 5, the main brush 13, and the first and second side brushes 15A and 15B, respectively.

As a result, dust on the cleaning surface is collected toward the suction port 18 and is suctioned through the suction port 18. The suctioned dust is collected in a filter (not shown). The filter is detachably arranged in the internal space of the housing 11. In this way, the dust collector 1 can clear the cleaning surface fully-automatically.

2-2. Configuration of Control Device
2-2-1. Configuration Related to First Feature As shown in FIG. 3, the control system 50 includes the above-described suction motor 31, the above-described first and second wheel motors 32 and 33, and the above-described first to third brushing motors 34 to 36.

The control system 50 further includes first to sixth drive circuits 51 to 56. The first drive circuit 51 drives the suction motor 31. The second drive circuit 52 drives the first wheel motor 32. The third drive circuit 53 drives the second wheel motor 33. The fourth drive circuit 54 drives the first brushing motor 34. The fifth drive circuit 55 drives the second brushing motor 35. The sixth drive circuit 56 drives the third brushing motor 36.

The control system 50 further includes a suction-motor control circuit 61, first and second wheel-motor control circuits 62 and 63, and first to third brushing-motor control circuits 64 to 66.

The suction-motor control circuit 61 controls the first drive circuit 51 to thereby control the suction motor 31. The first drive circuit 51 drives the suction motor 31 in accordance with a first drive command from the suction-motor control circuit 61.

The first wheel-motor control circuit 62 controls the second drive circuit 52 to thereby control the first wheel motor 32. The second drive circuit 52 drives the first wheel motor 32 in accordance with a second drive command from the first wheel-motor control circuit 62.

The second wheel-motor control circuit 63 controls the third drive circuit 53 to thereby control the second wheel motor 33. The third drive circuit 53 drives the second wheel motor 33 in accordance with a third drive command from the second wheel-motor control circuit 63.

The first brushing-motor control circuit 64 controls the fourth drive circuit 54 to thereby control the first brushing motor 34. The fourth drive circuit 54 drives the first brushing motor 34 in accordance with a fourth drive command from the first brushing-motor control circuit 64.

The second brushing-motor control circuit 65 controls the fifth drive circuit 55 to thereby control the second brushing motor 35. The fifth drive circuit 55 drives the second brushing motor 35 in accordance with a fifth drive command from the second brushing-motor control circuit 65.

The third brushing-motor control circuit 66 controls the sixth drive circuit 56 to thereby control the third brushing motor 36. The sixth drive circuit 56 drives the third brushing motor 36 in accordance with a sixth drive command from the third brushing-motor control circuit 66.

The control system 50 includes a centralized control circuit 70. The centralized control circuit 70 manages (or controls) motor controls by the above-described respective motor control circuits 61 to 66 in a centralized manner. The centralized control circuit 70 of the present embodiment is in the form of a microcontroller unit (MCU) (or a microcomputer) including a CPU, a ROM, and a RAM, which are not shown.

The centralized control circuit 70 calculates control parameters for the respective motors 31 to 36 based on the above-described first and second detection data and other data. The control parameters include, for example, a target rotation speed, a direction of rotation, and so on. The centralized control circuit 70 outputs the corresponding control parameters to the respective motor control circuits 61 to 66. The respective motor control circuits 61 to 66 control the corresponding drive circuits in accordance with the control parameters received from the centralized control circuit 70. This results in proper control of a running speed, a running direction, and a suction force of the dust collector 1.

The control system 50 includes a first current path LA1, a second current path LB1, a third current path LA2, a fourth current path LB2, and a fifth current path LC. The control system 50 further includes a first regulator 72 and a first power-supply controller 74.

The first current path LA1 includes a first end connected to the first positive-electrode terminal 41, and a second end. When the first battery pack 30A is attached to the first attachment portion 4A, the first end of the first current path LA1 is electrically connected to the positive electrode of the first battery BT1 via the first positive-electrode terminal 41.

The second current path LB1 includes a first end connected to the second positive-electrode terminal 43, and a second end. As shown in FIG. 3, the second end of the second current path LB1 is connected to the second end of the first current path LA1. In other words, as shown in FIG. 3, the control system 50 includes a connection point PX at which the second end of the first current path LA1 and the second end of the second current path LB1 are connected to each other. When the second battery pack 30B is attached to the second attachment portion 4B, the first end of the second current path LB1 is electrically connected to the positive electrode of the second battery BT2 via the second positive-electrode terminal 43.

The fifth current path LC includes a first end connected to the connection point PX, and two or more second ends. The two or more second ends are connected to a load. The load includes the first power-supply controller 74 and the first to sixth drive circuits 51 to 56. In other words, the first end of the fifth current path LC is connected to the second end of the first current path LA1 and to the second end of the second current path LB1.

When the first battery pack 30A is attached to the first attachment portion 4A, the first electric power can be supplied from the first battery pack 30A to the load via the first current path LA1 and the fifth current path LC. The first electric power is included in the first battery power.

When the second battery pack 30B is attached to the second attachment portion 4B, the second electric power can be supplied from the second battery pack 30B to the load via the second current path LB1 and the fifth current path LC. The second electric power is included in the second battery power.

The first power-supply controller 74 (i) receives a first electric power from the first battery pack 30A via the first current path LA1, or (ii) receives a second electric power from the second battery pack 30B via the second current path LB1. In the present embodiment, the first and second electric powers are each in the form of a direct-current power. The first power-supply controller 74 supplies the first electric power or the second electric power, whichever has been received, to the first regulator 72.

The first regulator 72 generates a first voltage (or a first power-supply voltage) Vdd based on the first electric power or the second electric power, whichever has been supplied from the first power-supply controller 74. In the present embodiment, the first voltage Vdd has a first fixed voltage value. The first voltage Vdd is supplied to the centralized control circuit 70 and its first peripheral circuit(s). The first voltage Vdd is also supplied to the suction-motor control circuit 61, to the first and second wheel-motor control circuits 62 and 63, and to the first to third brushing-motor control circuits 64 to 66. Each of the centralized control circuit 70, the first peripheral circuit(s), the suction-motor control circuit 61, the first and second wheel-motor control circuits 62 and 63, and the first to third brushing-motor control circuits 64 to 66 operates with the first voltage Vdd.

A combination of the first current path LA1 and the fifth current path LC may be referred to as the first current path LA1. In this case, the connection point PX is present between two ends of the first current path LA1, and the second end of the second current path LB1 is connected to a portion other than the two ends of the first current path LA1 (i.e., to the connection point PX). Moreover, for example, along with referring to the combination of the first current path LA1 and the fifth current path LC as the first current path LA1, a combination of the second current path LB1 and the fifth current path LC may be referred to as the second current path LB1. In this case, it can be said that the first current path LA1 and the second current path LB1 overlap each other on and subsequent to the connection point PX.

The control system 50 includes a first switch circuit SWA1 and a second switch circuit SWB1.

The first switch circuit SWA1 is on the first current path LA1. A first end of the first switch circuit SWA1 is electrically connected to the first positive-electrode terminal 41. A second end of the first switch circuit SWA1 is electrically connected to the connection point PX. More specifically, the second end of the first switch circuit SWA1 is electrically connected to the connection point PX via a third switch circuit SWA2 to be described below.

The second switch circuit SWB1 is on the second current path LB1. A first end of the second switch circuit SWB1 is electrically connected to the second positive-electrode terminal 43. A second end of the second switch circuit SWB1 is electrically connected to the connection point PX. More specifically, the second end of the second switch circuit SWB1 is electrically connected to the connection point PX via a fourth switch circuit SWB2 to be described below.

The first switch circuit SWA1 includes a first switch Q1. The first switch Q1 is in the form of a semiconductor switch. The first switch circuit SWA1 includes a first body diode D1. In other words, the first switch Q1 includes the first body diode D1. In the present embodiment, the first switch circuit SWA1 is in the form of a metal oxide semiconductor field-effect transistor (MOSFET) of an n-channel type. The first body diode D1 is generated in a process of manufacturing the first switch circuit SWA1.

The second switch circuit SWB1 is configured similarly to the first switch circuit SWA1. Specifically, the second switch circuit SWB1 includes a second switch Q2. The second switch Q2 is in the form of a semiconductor switch. The second switch circuit SWB1 includes a second body diode D2. In other words, the second switch Q2 includes the second body diode D2. In the present embodiment, the second switch circuit SWB1 is in the form of a MOSFET of an n-channel type. The second body diode D2 is generated in a process of manufacturing the second switch circuit SWB1.

The first switch circuit SWA1 (specifically, the first switch Q1) completes or interrupts the first current path LA1. The second switch circuit SWB1 (specifically, the second switch Q2) completes or interrupts the second current path LB1.

The first switch Q1 is on the first current path LA1. The first switch Q1 includes a drain electrically connected to the first positive-electrode terminal 41 and a source electrically connected to the connection point PX. The first body diode D1 includes a cathode electrically connected to the first positive-electrode terminal 41 and an anode electrically connected to the connection point PX. More specifically, the source of the first switch Q1 and the anode of the first body diode D1 are connected to the connection point PX via the third switch circuit SWA2. The drain of the first switch Q1 and the cathode of the first body diode D1 electrically correspond to the first end of the first switch circuit SWA1. The source of the first switch Q1 and the anode of the first body diode D1 electrically correspond to the second end of the first switch circuit SWA1.

The second switch Q2 is on the second current path LB1. The second switch Q2 includes a drain electrically connected to the second positive-electrode terminal 43 and a source electrically connected to the connection point PX. The second body diode D2 includes a cathode electrically connected to the second positive-electrode terminal 43 and an anode electrically connected to the connection point PX. More specifically, the source of the second switch Q2 and the anode of the second body diode D2 are connected to the connection point PX via the fourth switch circuit SWB2. The drain of the second switch Q2 and the cathode of the second body diode D2 electrically correspond to the first end of the second switch circuit SWB1. The source of the second switch Q2 and the anode of the second body diode D2 electrically correspond to the second end of the second switch circuit SWB1.

Each of the first and second switch circuits SWA1 and SWB1 is switched between an ON-state and an OFF-state. In other words, each of the first and second switches Q1 and Q2 is switched between an ON-state and an OFF-state. When the first switch circuit SWA1 is maintained in the OFF-state (i.e., when the first switch Q1 is maintained in the OFF-state), the first switch Q1 and the first body diode D1 inhibit or prevent a first electric current from flowing from the first battery pack 30A to the connection point PX. When the second switch circuit SWB1 is maintained in the OFF-state (i.e., when the second switch Q2 is maintained in the OFF-state), the second switch Q2 and the second body diode D2 inhibit or prevent a second electric current from flowing from the second battery pack 30B to the connection point PX.

More specifically, the ON-state and the OFF-state of the first switch circuit SWA1 respectively correspond to the ON-state and the OFF-state of the first switch Q1. Similarly, the ON-state and the OFF-state of the second switch circuit SWB1 respectively correspond to the ON-state and the OFF-state of the second switch Q2.

Each of the first and second switch circuits SWA1 and SWB1 is switched between the ON-state and the OFF-state by a power-supply management control circuit 80. Specifically, the power-supply management control circuit 80 outputs a first switch-ON signal to the first switch circuit SWA1 to switch the first switch circuit SWA1 to the ON-state, and outputs a second switch-ON signal to the second switch circuit SWB1 to switch the second switch circuit SWB1 to the ON-state. The power-supply management control circuit 80 outputs a first switch-OFF signal to the first switch circuit SWA1 to switch the first switch circuit SWA1 to the OFF-state, and outputs a second switch-OFF signal to the second switch circuit SWB1 to switch the second switch circuit SWB1 to the OFF-state.

In the first switch circuit SWA1 in the OFF-state, the first current path LA1 is electrically interrupted by the first switch Q1 in the OFF-state. In other words, the first switch circuit SWA1 in the OFF-state inhibits or prevents an electric current from flowing from the first positive-electrode terminal 41 to the third switch circuit SWA2 via the first switch circuit SWA1.

Even when the first switch circuit SWA1 is in the OFF-state, there is a possibility that a so-called leakage current may flow from the drain to the source in the first switch Q1 and/or a possibility that a so-called reverse current may flow through the first body diode D1. However, such a state in which the leakage current and/or the reverse current is flowing is also included in the state in which the first current path LA1 is electrically interrupted by the first switch Q1. The same applies to the second switch circuit SWB1, and to the third and fourth switch circuits SWA2 and SWB2 to be detailed below.

In the second switch circuit SWB1 in the OFF-state, the second current path LB1 is electrically interrupted by the second switch Q2 in the OFF-state. In other words, the second switch circuit SWB1 in the OFF-state inhibits or prevents an electric current from flowing from the second positive-electrode terminal 43 to the fourth switch circuit SWB2 via the second switch circuit SWB1.

The control system 50 includes the above-described power-supply management control circuit 80. The power-supply management control circuit 80 of the present embodiment is in the form of an MCU (or a microcomputer) including a CPU, a ROM, and a RAM, which are not shown. The power-supply management control circuit 80 controls the first switch circuit SWA1 and the second switch circuit SWB1, thereby designating (or setting or selecting) the first current path LA1 or the second current path LB1 as a power supply path. The power supply path refers to a path actually used for power supply to the load. Designating the first current path LA1 as the power supply path refers to, specifically, designating the first current path LA1 and the fifth current path LC as the power supply path. Designating the second current path LB1 as the power supply path refers to, specifically, designating the second current path LB1 and the fifth current path LC as the power supply path. The power-supply management control circuit 80 designates the first current path LA1 as the power supply path by, for example, maintaining the first switch circuit SWA1 in the ON-state and maintaining the second switch circuit SWB1 in the OFF-state. The power-supply management control circuit 80 designates the second current path LB1 as the power supply path by, for example, maintaining the first switch circuit SWA1 in the OFF-state and maintaining the second switch circuit SWB1 in the ON-state.

The control system 50 includes a first rectifier circuit 81, a second rectifier circuit 82, a second regulator 83, and a second power-supply controller 84.

The third current path LA2 includes a first end electrically connected to the first positive-electrode terminal 41 (i.e., to the first end of the first current path LA1) and a second end electrically connected to the second power-supply controller 84. The first rectifier circuit 81 is on the third current path LA2. A first end of the first rectifier circuit 81 is electrically connected to the first positive-electrode terminal 41. A second end of the first rectifier circuit 81 is electrically connected to the second power-supply controller 84.

The first rectifier circuit 81 allows an electric current to flow from the first end of the first rectifier circuit 81 to the second end of the first rectifier circuit 81, and inhibits or prevents an electric current from flowing from the second end of the first rectifier circuit 81 to the first end of the first rectifier circuit 81. The thus-configured first rectifier circuit 81 allows an electric current to flow from the first battery pack 30A to the second power-supply controller 84 through the third current path LA2. On the other hand, flow of an electric current from the second end of the first rectifier circuit 81 to the first battery pack 30A via the third current path LA2 is inhibited or prevented.

In the present embodiment, the first rectifier circuit 81 includes a first diode DA1 and a second diode DA2. The first and second diodes DA1 and DA2 are connected in series with each other in the present embodiment. That is, a cathode of the first diode DA1 is connected to an anode of the second diode DA2. An anode of the first diode DA1 electrically corresponds to the first end of the first rectifier circuit 81. A cathode of the second diode DA2 electrically corresponds to the second end of the first rectifier circuit 81. Any one of the first diode DA1 and the second diode DA2 may be omitted.

The fourth current path LB2 includes a first end electrically connected to the second positive-electrode terminal 43 (i.e., to the first end of the second current path LB1) and a second end electrically connected to the second power-supply controller 84. The second rectifier circuit 82 is on the fourth current path LB2. A first end of the second rectifier circuit 82 is electrically connected to the second positive-electrode terminal 43. A second end of the second rectifier circuit 82 is electrically connected to the second power-supply controller 84.

The second rectifier circuit 82 allows an electric current to flow from the first end of the second rectifier circuit 82 to the second end of the second rectifier circuit 82, and inhibits or prevents an electric current from flowing from the second end of the second rectifier circuit 82 to the first end of the second rectifier circuit 82. The thus-configured second rectifier circuit 82 allows an electric current to flow from the second battery pack 30B to the second power-supply controller 84 through the fourth current path LB2. On the other hand, flow of an electric current from the second end of the second rectifier circuit 82 to the second battery pack 30B via the fourth current path LB2 is inhibited or prevented.

In the present embodiment, the second rectifier circuit 82 includes a third diode DB1 and a fourth diode DB2. The third and fourth diodes DB1 and DB2 are connected in series with each other in the present embodiment. That is, a cathode of the third diode DB1 is connected to an anode of the fourth diode DB2. An anode of the third diode DB1 electrically corresponds to the first end of the second rectifier circuit 82. A cathode of the fourth diode DB2 electrically corresponds to the second end of the second rectifier circuit 82. Any one of the third diode DB1 and the fourth diode DB2 may be omitted.

The second power-supply controller 84 (i) receives a third electric power from the first battery pack 30A via the third current path LA2, and/or (ii) receives a fourth electric power from the second battery pack 30B via the fourth current path LB2. The third electric power is included in the first battery power. The fourth electric power is included in the second battery power. The third and fourth electric powers are each in the form of a direct-current power. The second power-supply controller 84 supplies the third electric power and/or the fourth electric power to the second regulator 83.

The second regulator 83 generates a second voltage (or a second power-supply voltage) Vcc based on the third electric power and/or the fourth electric power supplied from the second power-supply controller 84. In the present embodiment, the second voltage Vcc has a second fixed voltage value. The second voltage Vcc is supplied to the power-supply management control circuit 80 and its second peripheral circuit(s). The second peripheral circuit(s) include(s), for example, the display 20D.

A combination of the first rectifier circuit 81 and the second rectifier circuit 82 constitute a so-called diode OR (or a wired OR). That is, the second power-supply controller 84 is connected to the first battery pack 30A and the second battery pack 30B via the diode OR. Thus, it is possible to (i) inhibit an electric current from flowing in reverse from the second power-supply controller 84 to the first battery pack 30A via the first rectifier circuit 81 and (ii) inhibit an electric current from flowing in reverse from the second power-supply controller 84 to the second battery pack 30B via the second rectifier circuit 82.

Accordingly, it is possible to inhibit an electric current from flowing from the first battery pack 30A to the second battery pack 30B through the third current path LA2 and the fourth current path LB2, and to inhibit an electric current from flowing from the second battery pack 30B to the first battery pack 30A through the fourth current path LB2 and the third current path LA2.

2-2-2. Effects of Configuration Related to First Feature

In the present embodiment, the second power-supply controller 84 (i) receives the third electric power from the first battery pack 30A via the first rectifier circuit 81, or (ii) receives the fourth electric power from the second battery pack 30B via the second rectifier circuit 82. The present embodiment may be configured such that, for example, only the second power-supply controller 84 receives the third electric power or the fourth electric power.

On the other hand, the first power-supply controller 74 (i) receives the first electric power from the first battery pack 30A via the first current path LA1 and the fifth current path LC, or (ii) receives the second electric power from the second battery pack 30B via the second current path LB1 and the fifth current path LC. The first electric power is supplied to the first power-supply controller 74 via the first switch circuit SWA1 (more specifically, further via the third switch circuit SWA2). The second electric power is supplied to the first power-supply controller 74 via the second switch circuit SWB1 (more specifically, further via the fourth switch circuit SWB2).

Thus, in the present embodiment, heat generation in the first rectifier circuit 81 and/or the second rectifier circuit 82 and the resulting deterioration or failure thereof are inhibited. In other words, heat generation in the first diode DA1 and/or the second diode DA2 and/or the third diode DB1 and/or the fourth diode DB2, and the resulting deterioration or failure thereof are inhibited.

Consequently, there is little or no necessity of increasing the size of the first to fourth diodes DA1 to DB2 and/or providing a cooling fan in order to inhibit heat generation in these diodes. Thus, it is possible to inhibit heat generation in the first to fourth diodes DA1 to DB2 while reducing increase in size and/or cost of the control system 50.

2-2-3. Configuration Related to Second Feature
2-2-3-1. Overview of Electrical Configuration The control system 50 includes the above-described third switch circuit SWA2 and the above-described fourth switch circuit SWB2.

The third switch circuit SWA2 is on the first current path LA1. More specifically, the third switch circuit SWA2 is between the first switch circuit SWA1 and the connection point PX on the first current path LA1. A first end of the third switch circuit SWA2 is electrically connected to the second end of the first switch circuit SWA1. A second end of the third switch circuit SWA2 is electrically connected to the connection point PX.

The fourth switch circuit SWB2 is on the second current path LB1. More specifically, the fourth switch circuit SWB2 is between the second switch circuit SWB1 and the connection point PX on the second current path LB1. A first end of the fourth switch circuit SWB2 is electrically connected to the second end of the second switch circuit SWB1. A second end of the fourth switch circuit SWB2 is electrically connected to the connection point PX.

The third switch circuit SWA2 includes a third switch Q3. The third switch Q3 is in the form of a semiconductor switch. The third switch circuit SWA2 includes a third body diode D3. In other words, the third switch Q3 includes the third body diode D3. In the present embodiment, the third switch Q3 is in the form of a MOSFET of an n-channel type. The third body diode D3 is generated in a process of manufacturing the third switch circuit SWA2.

The fourth switch circuit SWB2 is configured similarly to the third switch circuit SWA2. Specifically, the fourth switch circuit SWB2 includes a fourth switch Q4. The fourth switch Q4 is in the form of a semiconductor switch. The fourth switch circuit SWB2 includes a fourth body diode D4. In other words, the fourth switch Q4 includes the fourth body diode D4. In the present embodiment, the fourth switch Q4 is in the form of a MOSFET of an n-channel type. The fourth body diode D4 is generated in a process of manufacturing the fourth switch circuit SWB2.

The third switch circuit SWA2 (specifically, the third switch Q3) completes or interrupts the first current path LA1. The fourth switch circuit SWB2 (specifically, the fourth switch Q4) completes or interrupts the second current path LB1.

The third switch Q3 is on the first current path LA1. The third switch Q3 includes a source electrically connected to the second end of the first switch circuit SWA1 and a drain electrically connected to the connection point PX. The third body diode D3 includes an anode electrically connected to the first switch circuit SWA1 and a cathode electrically connected to the connection point PX. The source of the third switch Q3 and the anode of the third body diode D3 electrically correspond to the first end of the third switch circuit SWA2. The drain of the third switch Q3 and the cathode of the third body diode D3 electrically correspond to the second end of the third switch circuit SWA2.

The fourth switch Q4 is on the second current path LB1. The fourth switch Q4 includes a source electrically connected to the second end of the second switch circuit SWB1 and a drain electrically connected to the connection point PX. The fourth body diode D4 includes an anode electrically connected to the second switch circuit SWB1 and a cathode electrically connected to the connection point PX. The source of the fourth switch Q4 and the anode of the fourth body diode D4 electrically correspond to the first end of the fourth switch circuit SWB2. The drain of the fourth switch Q4 and the cathode of the fourth body diode D4 electrically correspond to the second end of the fourth switch circuit SWB2.

Each of the third and fourth switch circuits SWA2 and SWB2 is switched between an ON-state and an OFF-state. In other words, each of the third and fourth switches Q3 and Q4 is switched between an ON-state and an OFF-state. When the third switch circuit SWA2 is maintained in the OFF-state (i.e., when the third switch Q3 is maintained in the OFF-state), the third switch Q3 and the third body diode D3 inhibit or prevent an electric current from flowing from the connection point PX to the first switch circuit SWA1 (i.e., flowing in reverse). When the fourth switch circuit SWB2 is maintained in the OFF-state (i.e., when the fourth switch Q4 is maintained in the OFF-state), the fourth switch Q4 and the fourth body diode D4 inhibit or prevent an electric current from flowing from the connection point PX to the second switch circuit SWB1 (i.e., from flowing in reverse).

Each of the third and fourth switch circuits SWA2 and SWB2 is switched between the ON-state and the OFF-state by the power-supply management control circuit 80, similarly to the first and second switch circuits SWA1 and SWB1. Specifically, the power-supply management control circuit 80 outputs a first ON signal to the third switch circuit SWA2 to switch the third switch circuit SWA2 to the ON-state, and outputs a second ON signal to the fourth switch circuit SWB2 to switch the fourth switch circuit SWB2 to the ON-state. The power-supply management control circuit 80 outputs a first OFF signal to the third switch circuit SWA2 to switch the third switch circuit SWA2 to the OFF-state, and outputs a second OFF signal to the fourth switch circuit SWB2 to switch the fourth switch circuit SWB2 to the OFF-state.

When designating the first current path LA1 as the power supply path, the power-supply management control circuit 80 (i) maintains the first switch circuit SWA1 in the ON-state, and also (ii) maintains the third switch circuit SWA2 in the ON-state. This allows the electric power of the first battery pack 30A (i.e., the first electric power) to be supplied to the load with low loss via the first current path LA1.

When designating the second current path LB1 as the power supply path, the power-supply management control circuit 80 (i) maintains the second switch circuit SWB1 in the ON-state, and also (ii) maintains the fourth switch circuit SWB2 in the ON-state. This allows the electric power of the second battery pack 30B (i.e., the second electric power) to be supplied to the load with low loss via the second current path LB1.

Here, terms "present path" and "new path" to be used in explaining switching of the power supply path will be defined. The "present path" refers to one of the first and second current paths LA1 and LB1, whichever is designated at present as the power supply path. The "new path" refers to the other one of the first and second current paths LA1 and LB1, which is different from the present path. That is, the "present path" is a path currently functioning as the power supply path until being switched. The "new path" is a path to be newly designated as the power supply path by being switched.

When switching the power supply path from the present path to the new path, the power-supply management control circuit 80 changes over (or inverts) the switch states (or ON/OFF states) of the first and second switch circuits SWA1 and SWB1. The "switch state" (or the "ON/OFF state") refers to in which of the ON-state and the OFF-state each switch is. For example, changing over the switch state of the first switch circuit SWA1 now being in the ON-state corresponds to switching the first switch circuit SWA1 to the OFF-state. Similarly, for example, changing over the switch state of the second switch circuit SWB1 now being in the OFF-state corresponds to switching the second switch circuit SWB1 to the ON-state.

In the present embodiment, however, when switching the power supply path from the present path to the new path, the power-supply management control circuit 80 does not change over the switch states of the first and second switch circuits SWA1 and SWB1 immediately. When switching the power supply path from the present path to the new path, the power-supply management control circuit 80 maintains both of the first and second switch circuits SWA1 and SWB1 in the ON-state temporarily. In other words, the power-supply management control circuit 80 maintains one of the first and second switch circuits SWA1 and SWB1, whichever is in the ON-state (hereinafter referred to as a "currently-ON switch"), in the ON-state, and, while keeping this state, switches the other one that is in the OFF-state to the ON-state.

This is to avoid instantaneous interruption of power supply to the load when switching the power supply path. When switching the power supply path from the second current path LB1 to the first current path LA1, too, both of the first switch circuit SWA1 and the second switch circuit SWB1 are temporarily maintained in the ON-state.

When switching the power supply path, if the third and fourth switch circuits SWA2 and SWB2 are maintained in the ON-state, an electric current may flow (i) from the second battery pack 30B to the first battery pack 30A via the second current path LB1 and the first current path LA1 or (ii) from the first battery pack 30A to the second battery pack 30B via the first current path LA1 and the second current path LB1.

Thus, when switching the power supply path, the power-supply management control circuit 80 first maintains both of the third and fourth switch circuits SWA2 and SWB2 in the OFF-state. This results in inhibiting or preventing the electric current from flowing from the connection point PX to the first switch circuit SWA1 or to the second switch circuit SWB1.

In such a state in which the third and fourth switch circuits SWA2 and SWB2 are both maintained in the OFF-state, the power-supply management control circuit 80 temporarily maintains both of the first and second switch circuits SWA1 and SWB1 in the ON-state as described above. Subsequently, the currently-ON switch, which is still maintained in the ON-state, is switched to the OFF-state. This finally results in changing over the switch states of the first and second switch circuits SWA1 and SWB1, thus switching the power supply path to the new path.

Upon changing over the switch states of the first and second switch circuits SWA1 and SWB1, the power-supply management control circuit 80 switches one of the third and fourth switch circuits SWA2 and SWB2, whichever is on the new path, to the ON-state.

This is because, when the third and fourth switch circuits SWA2 and SWB2 are maintained in the OFF-state after the power supply path is switched, a load current flows through one of the third and fourth body diodes D3 and D4, whichever is on the new path.

For example, if the load current keeps on flowing through the third body diode D3, heat generation may occur in the third body diode D3, thus leading to a possibility of deterioration or failure of the third switch circuit SWA2. The same applies to a case in which the load current keeps on flowing through the fourth body diode D4.

Thus, in the present embodiment, upon completion of the switching of the power supply path, one of the third and fourth switch circuits SWA2 and SWB2, whichever is on the new path, is switched to the ON-state. This results in inhibiting heat generation in the third and fourth body diodes D3 and D4.

The control system 50 includes a first voltage detector 86. The first voltage detector 86 detects a voltage of the first current path LA1, and outputs a first detection signal to the power-supply management control circuit 80. The first detection signal indicates a value of the detected voltage of the first current path LA1 (hereinafter referred to as a "first detected voltage value"). In the present embodiment, the first voltage detector 86 is connected to between the first switch circuit SWA1 and the third switch circuit SWA2, on the first current path LA1. Thus, more specifically, the first voltage detector 86 of the present embodiment detects a voltage at such a connection portion on the first current path LA1.

The control system 50 includes a second voltage detector 88. The second voltage detector 88 detects a voltage of the second current path LB1, and outputs a second detection signal to the power-supply management control circuit 80. The second detection signal indicates a value of the detected voltage of the second current path LB1 (hereinafter referred to as a "second detected voltage value"). In the present embodiment, the second voltage detector 88 is connected to between the second switch circuit SWB1 and the fourth switch circuit SWB2, on the second current path LB1. Thus, more specifically, the second voltage detector 88 of the present embodiment detects a voltage at such a connection portion on the second current path LB1.

The power-supply management control circuit 80 acquires the value of the voltage of the first current path LA1 or the second current path LB1, whichever is selected as the power supply path, from the first voltage detector 86 or the second voltage detector 88, respectively.

Before the electric power is supplied to the load via the first current path LA1 or the second current path LB1, the power-supply management control circuit 80 determines whether the first switch circuit SWA1 or the second switch circuit SWB1 is in failure.

Before the electric power is supplied to the load, the first and second switch circuits SWA1 and SWB1 are maintained in the OFF-state. Thus, the first and second current paths LA1 and LB1 are not supplied with the electric power. Accordingly, the first and second detected voltage values are zero.

However, in a case where the first switch circuit SWA1 or the second switch circuit SWB1 is in failure (e.g., short-circuited), the first detected voltage value or the second detected voltage value, respectively, is not zero. In this case, the first detected voltage value close to or equal to an output voltage of the first battery pack 30A, or the second detected voltage value close to or equal to an output voltage of the second battery pack 30B, respectively, is detected.

Thus, the power-supply management control circuit 80 determines that the first switch circuit SWA1 or the second switch circuit SWB1 is in failure when (i) the first and second switch circuits SWA1 and SWB1 are maintained in the OFF-state and (ii) the first detected voltage value or the second detected voltage value, respectively, is not zero. Upon determining that the first switch circuit SWA1 or the second switch circuit SWB1 is in failure, the power-supply management control circuit 80 notifies the user of occurrence of such failure through the interfacing device 20 without having an electric power supplied to the load.

The control system 50 includes a third voltage detector 90. The third voltage detector 90 detects a third voltage and a fourth voltage selectively, for example. The third voltage corresponds to a voltage between the source and the drain of the third switch circuit SWA2, that is, a voltage across the third body diode D3. The fourth voltage corresponds to a voltage between the source and the drain of the fourth switch circuit SWB2, that is, a voltage across the fourth body diode D4.

The third voltage detector 90 is in the form of, for example, a differential amplifier including an operational amplifier or the like. The third voltage detector 90 outputs a third detection signal and a fourth detection signal to the power-supply management control circuit 80 selectively, for example. The third detection signal indicates a value of the detected third voltage (hereinafter referred to as a "third voltage value"). The fourth detection signal indicates a value of the detected fourth voltage (hereinafter referred to as a "fourth voltage value"). As described below, the power-supply management control circuit 80 detects a failure in the third switch circuit SWA2 and a failure in the fourth switch circuit SWB2 based on the third detection signal and the fourth detection signal, respectively.

The third voltage detector 90 includes a first input terminal 90A and a second input terminal 90B. In the present embodiment, for example, the first input terminal 90A is electrically connected to between the drain of the third switch circuit SWA2 (i.e., the drain of the third switch Q3) and the connection point PX, on the first current path LA1. In the present embodiment, the drain of the third switch circuit SWA2 is electrically connected to the drain of the fourth switch circuit SWB2 (i.e., the drain of the fourth switch Q4) and to the first power-supply controller 74 via the connection point PX. Thus, it can be said that the first input terminal 90A is electrically connected to the drain of the third switch circuit SWA2 and to the drain of the fourth switch circuit SWB2. As is obvious from FIG. 3, a voltage of the drain of the third switch circuit SWA2 is equal to or almost equal to a voltage of the drain of the fourth switch circuit SWB2.

The control system 50 includes a first detection switch SWa, a second detection switch SWb, and a fifth switch SWc. The fifth switch SWc includes a fifth semiconductor switch Q5. The first detection switch SWa includes sixth and seventh semiconductor switches Q6 and Q7 connected in series with each other. The second detection switch SWb includes eighth and ninth semiconductor switches Q8 and Q9 connected in series with each other.

The second input terminal 90B of the third voltage detector 90 is connected to between the first switch circuit SWA1 and the third switch circuit SWA2, on the first current path LA1, via the first detection switch SWa.

Further, the second input terminal 90B is also connected to between the second switch circuit SWB1 and the fourth switch circuit SWB2, on the second current path LB1, via the second detection switch SWb.

The first detection switch SWa establishes or interrupts the electrical connection between the second input terminal 90B and the first current path LA1.

In the first detection switch SWa, each of the sixth and seventh semiconductor switches Q6 and Q7 is in the form of a MOSFET of a p-channel type, in the present embodiment. The sixth and seventh semiconductor switches Q6 and Q7 include sixth and seventh body diodes D6 and D7, respectively. A source of the sixth semiconductor switch Q6 is connected to the second input terminal 90B of the third voltage detector 90. A drain of the sixth semiconductor switch Q6 is connected to a drain of the seventh semiconductor switch Q7. Thus, an anode of the sixth body diode D6 is connected to an anode of the seventh body diode D7. A source of the seventh semiconductor switch Q7 is connected to the first current path LA1.

The second detection switch SWb establishes or interrupts the electrical connection between the second input terminal 90B and the second current path LB1. The second detection switch SWb of the present embodiment is configured similarly to the first detection switch SWa. That is, in the second detection switch SWb, each of the eighth and ninth semiconductor switches Q8 and Q9 is in the form of a MOSFET of a p-channel type, in the present embodiment. The eighth and ninth semiconductor switches Q8 and Q9 include eighth and ninth body diodes D8 and D9, respectively. A source of the eighth semiconductor switch Q8 is connected to the second input terminal 90B of the third voltage detector 90. A drain of the eighth semiconductor switch Q8 is connected to a drain of the ninth semiconductor switch Q9. Thus, an anode of the eighth body diode D8 is connected to an anode of the ninth body diode D9. A source of the ninth semiconductor switch Q9 is connected to the second current path LB1.

Accordingly, in the first detection switch SWa, when the sixth and seventh semiconductor switches Q6 and Q7 are in an OFF-state, the second input terminal 90B is electrically interrupted (e.g., interrupted more reliably) from the first current path LA1. Similarly, in the second detection switch SWb, when the eighth and ninth semiconductor switches Q8 and Q9 are in an OFF-state, the second input terminal 90B is electrically interrupted (e.g., interrupted more reliably) from the second current path LB1.

When detecting the third voltage value via the third voltage detector 90, the power-supply management control circuit 80 switches the first detection switch SWa to an ON-state. This results in applying the voltage across the third body diode D3 to between the first and second input terminals 90A and 90B. As a result, the third detection signal is output from the third voltage detector 90.

Similarly, when detecting the fourth voltage value via the third voltage detector 90, the power-supply management control circuit 80 switches the second detection switch SWb to an ON-state. This results in applying the voltage across the fourth body diode D4 to between the first and second input terminals 90A and 90B. As a result, the fourth detection signal is output from the third voltage detector 90.

The fifth switch SWc is used to determine whether the third switch circuit SWA2 or the fourth switch circuit SWB2 is in failure. This determination is made before the electric power is supplied to the load via the first current path LA1 or via the second current path LB1. This determination is made using the first voltage detector 86 or the second voltage detector 88.

In the present embodiment, the fifth semiconductor switch Q5 is in the form of a MOSFET of a p-channel type. The fifth semiconductor switch Q5 includes a fifth body diode D5. A source of the fifth semiconductor switch Q5 receives the second voltage Vcc. A drain of the fifth semiconductor switch Q5 is connected to an anode of a tenth diode D10. A cathode of the tenth diode D10 is electrically connected to the connection point PX. The tenth diode D10 inhibits or prevents an electric current from flowing in reverse from the connection point PX to the second regulator 83.

Before supplying the electric power to the load, the power-supply management control circuit 80 switches the fifth switch SWc to an ON-state, and determines whether the third switch circuit SWA2 or the fourth switch circuit SWB2 is in failure.

When the fifth switch SWc is switched to the ON-state, if the third switch circuit SWA2 is not in failure and is in the OFF-state, the second voltage Vcc is not applied to the first voltage detector 86. Thus, the first detected voltage value is zero in this case. However, if the third switch circuit SWA2 is in failure (e.g., short-circuited), the first detected voltage value is not zero, but may be a value close to the second voltage Vcc, for example.

Further, when the fifth switch SWc is switched to the ON-state, if the fourth switch circuit SWB2 is not in failure and is in the OFF-state, the second voltage Vcc is not applied to the second voltage detector 88. Thus, the second detected voltage value is zero in this case. However, if the fourth switch circuit SWB2 is in failure (e.g., short-circuited), the second detected voltage value is not zero, but may be a value close to the second voltage Vcc, for example.

Accordingly, when the first detected voltage value is not zero (including near zero), the power-supply management control circuit 80 determines that the third switch circuit SWA2 is in failure, and when the second detected voltage value is not zero (including near zero), the power-supply management control circuit 80 determines that the fourth switch circuit SWB2 is in failure.

Upon determining that the third switch circuit SWA2 or the fourth switch circuit SWB2 is in failure, the power-supply management control circuit 80 notifies the user of occurrence of such failure through the interfacing device 20 without having an electric power supplied to the load.

2-2-3-2. Switching Control Process

Figure 4:
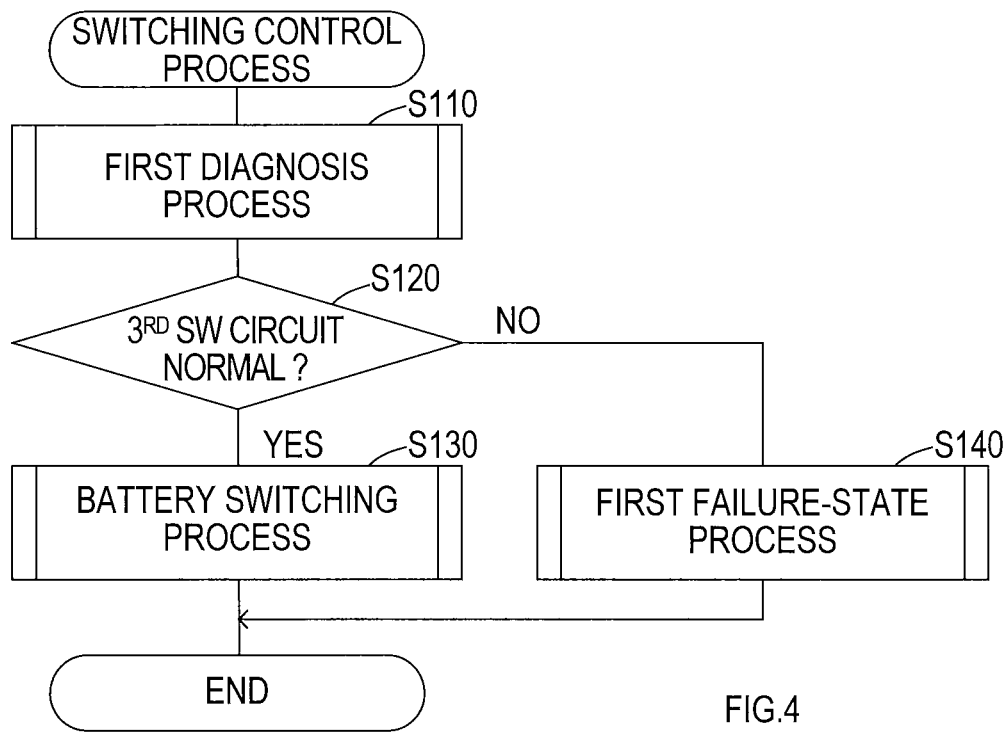
FIG. 4 is a flowchart showing a switching control process performed by a power-supply management control circuit.

A switching control process will be described here with reference to FIG. 4. The switching control process is performed by the power-supply management control circuit 80 (more specifically, by the CPU of the power-supply management control circuit 80). The switching control process in FIG. 4 is performed when, for example, a first switching requirement is satisfied. The first switching requirement is required for switching a source of power supply to the load from the first battery pack 30A to the second battery pack 30B. In other words, the first switching requirement is required for switching the power supply path from the first current path LA1 to the second current path LB1. The first switching requirement may be satisfied when, for example, the remaining energy stored in the first battery BT1 is smaller than or equal to a remaining-energy threshold. The first switching requirement may be satisfied when, for example, the voltage of the first battery BT1 is smaller than or equal to a voltage threshold. The source of power supply to the load is switched from the first battery pack 30A to the second battery pack 30B by performing the switching control process.

In the present embodiment, a program for the switching control process is stored in advance in the power-supply management control circuit 80. The CPU of the power-supply management control circuit 80 executes the program to thereby perform the switching control process.

At the start of the switching control process, the source of power supply has been set to the first battery pack 30A. That is, the first current path LA1 has been designated as the power supply path. The power-supply management control circuit 80 may designate the first current path LA1 as the power supply path when a second switching requirement is satisfied. The second switching requirement may be satisfied when, for example, the remaining energy stored in the second battery BT2 is smaller than or equal to a remaining-energy threshold.

When the first current path LA1 is designated as the power supply path, the power-supply management control circuit 80 switches the first switch circuit SWA1 and the third switch circuit SWA2 to their respective ON-states, and switches the second switch circuit SWB1 and the fourth switch circuit SWB2 to their respective OFF-states.

Thus, at the start of the switching control process, the first switch circuit SWA1 and the third switch circuit SWA2 are maintained in the ON-state, and the second switch circuit SWB1 and the fourth switch circuit SWB2 are maintained in the OFF-state. This state corresponds to one example of the first steady state in "Overview of Embodiment".

Further, at the start of the switching control process, failure determination on the third switch circuit SWA2 or the fourth switch circuit SWB2 has not been performed. Thus, the first and second detection switches SWa and SWb, and the fifth switch SWc are also maintained in the OFF-state.

As shown in FIG. 4, upon starting the switching control process, in S110, the power-supply management control circuit 80 performs a first diagnosis process. The first diagnosis process diagnoses whether the third switch circuit SWA2 is in failure. Details of the first diagnosis process are shown in FIG. 5.

Figure 5:
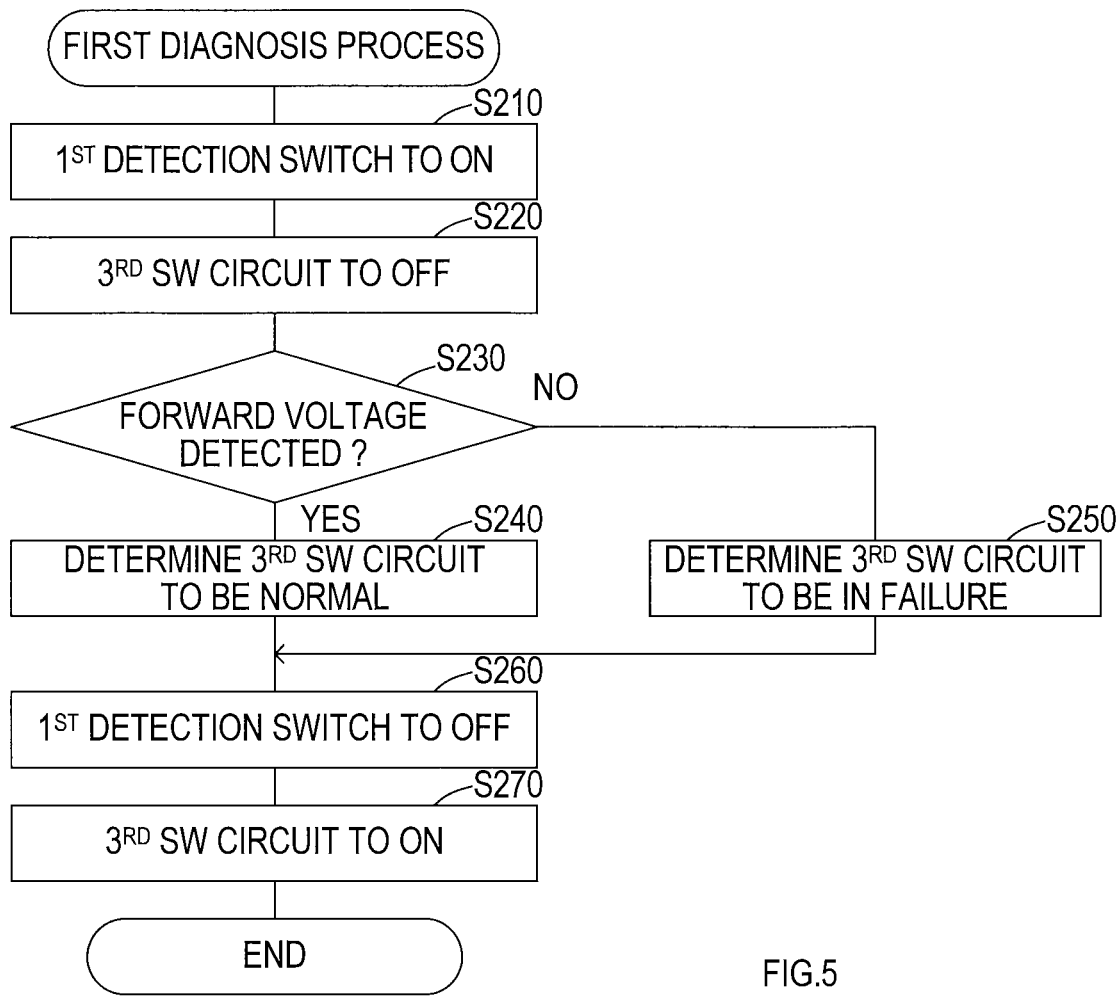
FIG. 5 is a flowchart showing a first diagnosis process indicated in FIG. 4.

As shown in FIG. 5, upon proceeding to the first diagnosis process, in S210, the power-supply management control circuit 80 switches the first detection switch SWa to the ON-state. In subsequent S220, the power-supply management control circuit 80 switches the third switch circuit SWA2 to the OFF-state. This results in inputting the third voltage to the third voltage detector 90.

In this state, the electric power (the first electric power) is supplied from the first battery pack 30A to the load via the first current path LA1. Thus, when the third switch circuit SWA2 is switched to the OFF-state, the load current flows through the third body diode D3. This results in generation of a specific forward voltage across the third body diode D3. However, if the third switch Q3 is in failure (e.g., short-circuited), little or no load current flows through the third body diode D3. Thus, the third voltage is zero or extremely lower than the forward voltage.

Accordingly, in S230, the power-supply management control circuit 80 determines whether the specific forward voltage is generated in the third body diode D3 based on the magnitude of the third voltage detected by the third voltage detector 90. Specifically, the power-supply management control circuit 80 may determine that the specific forward voltage is generated in the third body diode D3 when the magnitude of the third voltage is greater than or equal to a first threshold. The first threshold may be determined to be any value. The first threshold may be determined to be, for example, a value within a range smaller than or equal to the rated value of the forward voltage and greater than zero.

If it is determined in S230 that the specific forward voltage is generated, the power-supply management control circuit 80 determines in S240 that the third switch circuit SWA2 is normal (or proper). Then, the process proceeds to S260. If it is determined in S230 that the specific forward voltage is not generated, the power-supply management control circuit 80 determines in S250 that the third switch circuit SWA2 (more specifically, the third switch Q3) is in failure. Then, the process proceeds to S260.

In S260, the power-supply management control circuit 80 switches the first detection switch SWa back to the OFF-state. In S270, the power-supply management control circuit 80 switches the third switch circuit SWA2 back to the ON-state. This brings the first detection switch SWa and the third switch circuit SWA2 back to an initial state. The initial state corresponds to a state at the start of the switching control process. After the process of S270, the power-supply management control circuit 80 ends the first diagnosis process, and proceeds to S120 (see FIG. 4).

In S120, the power-supply management control circuit 80 determines whether the third switch circuit SWA2 is normal based on the result of diagnosis in the first diagnosis process.

If it is determined in S120 that the third switch circuit SWA2 is normal, the process proceeds to S130. In S130, the power-supply management control circuit 80 performs a battery switching process.

If it is determined in S120 that the third switch circuit SWA2 is not normal (i.e., is in failure), this process proceeds to S140. In S140, the power-supply management control circuit 80 performs a first failure-state process.

Under the condition in which the first failure-state process of S140 is to be performed, the third switch circuit SWA2 is in failure (e.g., short-circuited) and cannot interrupt the first current path LA1. Thus, in S140, the power-supply management control circuit 80 (i) outputs a motor stop command to the centralized control circuit 70 and (ii) displays the error on the display 20D. The motor stop command is a command to reduce in speed or stop the respective motors 31 to 36.

Upon receiving the motor stop command from the power-supply management control circuit 80, the centralized control circuit 70 commands the respective motor control circuits 61 to 66 to reduce in speed or stop the corresponding motors 31 to 36, respectively. This results in reducing in speed or stopping the respective motors 31 to 36.

Figure 6:
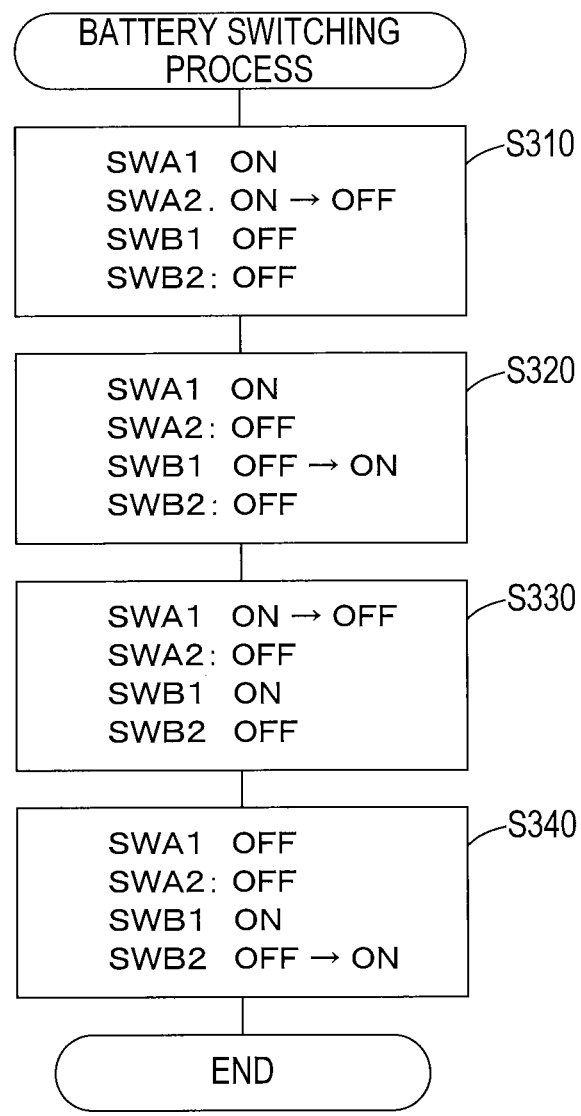
FIG. 6 is a flowchart showing a battery switching process indicated in FIG. 4.

Details of the battery switching process of S130 are shown in FIG. 6. Upon proceeding to the battery switching process, in S310, the power-supply management control circuit 80 switches the third switch circuit SWA2 from the ON-state to the OFF-state. In S310, the first switch circuit SWA1 is maintained in the ON-state, and the second switch circuit SWB1 and the fourth switch circuit SWB2 are maintained in the OFF-state. This state corresponds to one example of the first transient state in "Overview of Embodiment".

In S320, the power-supply management control circuit 80 switches the second switch circuit SWB1 from the OFF-state to the ON-state. In S320, the first switch circuit SWA1 is maintained in the ON-state, and the third switch circuit SWA2 and the fourth switch circuit SWB2 are maintained in the OFF-state. This state corresponds to one example of the second transient state in "Overview of Embodiment".

In S330, the power-supply management control circuit 80 switches the first switch circuit SWA1 from the ON-state to the OFF-state. In S330, the second switch circuit SWB1 is maintained in the ON-state, and the third switch circuit SWA2 and the fourth switch circuit SWB2 are maintained in the OFF-state.

In S340, the power-supply management control circuit 80 switches the fourth switch circuit SWB2 from the OFF-state to the ON-state. In S340, the first switch circuit SWA1 and the third switch circuit SWA2 are maintained in the OFF-state, and the second switch circuit SWB1 is maintained in the ON-state. After the process of S340, the power-supply management control circuit 80 ends the battery switching process. This state corresponds to one example of the second steady state in "Overview of Embodiment".

Figure 7:
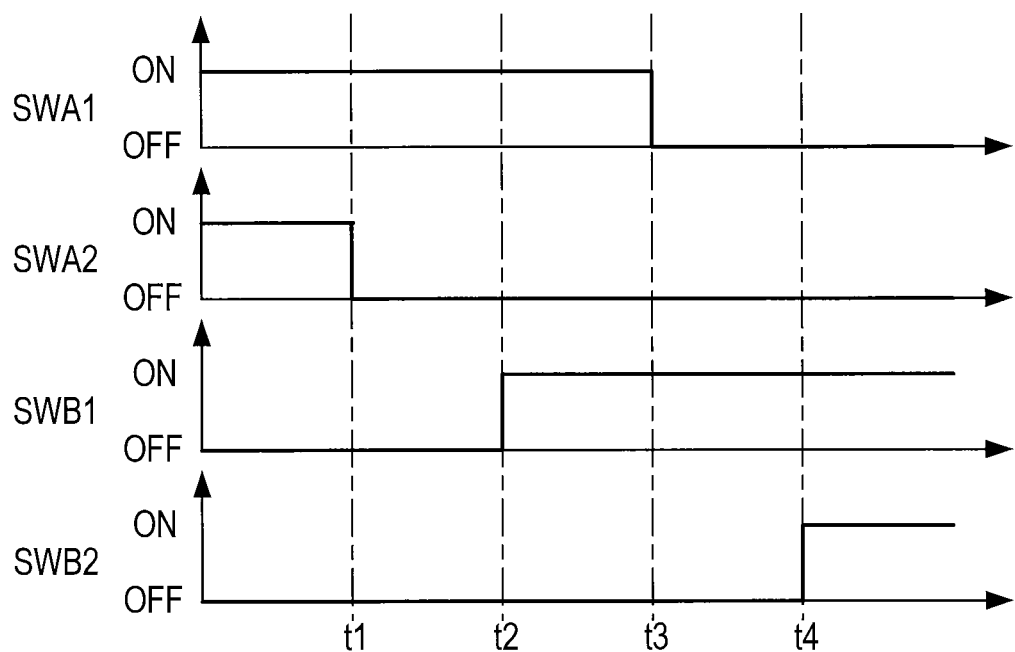
FIG. 7 is a time chart showing transition of ON/OFF states of respective switches, which are changed over in the battery switching process.

As illustrated in FIG. 7, in the battery switching process of S130, the switch states of the third switch circuit SWA2, the second switch circuit SWB1, the first switch circuit SWA1, and the fourth switch circuit SWB2 are changed over (i.e., inverted from the respective initial states) in this order.

Specifically, when the battery switching process is performed, first at a time point t1, the third switch circuit SWA2 is switched to the OFF-state. This results in inhibiting or preventing reverse flow of the electric current on the first current path LA1.

Next, at a time point t2, the second switch circuit SWB1 is switched to the ON-state. This causes the first and second current paths LA1 and LB1 both to be completed. At that time, the output voltage of the second battery pack 30B is presumed to be higher than that of the first battery pack 30A before the path switching. In this case, however, the third switch circuit SWA2 is maintained in the OFF-state. This results in inhibiting or preventing an electric current from flowing from the second battery pack 30B to the first battery pack 30A.

Next, at a time point t3, the first switch circuit SWA1 is switched to the OFF-state. This results in interrupting the first current path LA1, thus switching the power supply path from the first current path LA1 to the second current path LB1.

Then, at a time point t4, the fourth switch circuit SWB2 is switched to the ON-state. As a result, all or almost all of the load current flowing through the fourth switch circuit SWB2 flows through the fourth switch Q4. That is, little or no load current flows through the fourth body diode D4. This makes it possible to supply the second electric power from the second battery pack 30B to the load with low loss via the second current path LB1.

2-2-4. Effects of Configuration Related to Second Feature

As described above, in the present embodiment, when switching the power supply path from the first current path LA1 to the second current path LB1, it is possible to inhibit instantaneous interruption of the electric power to be supplied to the load.

Moreover, switching the third switch circuit SWA2 to the OFF-state results in inhibiting or preventing the electric current from flowing from the second battery pack 30B to the first battery pack 30A.

Furthermore, the failure determination on the third switch circuit SWA2 is performed before the power supply path is switched and, if the third switch circuit SWA2 is in failure, driving of the respective motors 31 to 36 is stopped. In this case, the user is notified of occurrence of the failure through the display 20D.

Thus, even when the third switch circuit SWA2 is in failure and the first current path LA1 is thereby not interrupted, it is possible to inhibit an overcurrent from flowing through the first current path LA1 and to inhibit an electric current from flowing in reverse through the first current path LA1. Consequently, the safety of the control system 50 can be enhanced.

2-3. Correspondence Between Terms

The dust collector 1 corresponds to one example of the battery-operated device in "Overview of Embodiment". A combination of the first power-supply controller 74 and the first regulator 72 corresponds to one example of the first power-supply circuit in "Overview of Embodiment". A combination of the second power-supply controller 84 and the second regulator 83 corresponds to one example of the second power-supply circuit in "Overview of Embodiment". At least one of the motor control circuits 61 to 66 and/or the centralized control circuit 70 correspond(s) to one example of the first control circuit in "Overview of Embodiment". The power-supply management control circuit 80 corresponds to one example of the second control circuit in "Overview of Embodiment". The first diode DA1 and the second diode DA2 correspond to one example of the first rectifier in "Overview of Embodiment". The third diode DB1 and the fourth diode DB2 correspond to one example of the second rectifier in "Overview of Embodiment". At least one of the drive circuits 51 to 56 corresponds to one example of the drive circuit in "Overview of Embodiment". At least one of the motors 31 to 36 corresponds to one example of the electric load in "Overview of Embodiment". At least one of the suction fan 5, the first wheel 9A, the second wheel 9B, the main brush 13, the first side brush 15A, and the second side brush 15B corresponds to one example of the tool in "Overview of Embodiment". The third body diode D3 corresponds to one example of the third rectifier in "Overview of Embodiment". The fourth body diode D4 corresponds to one example of the fourth rectifier in "Overview of Embodiment".

3. Other Embodiments

A mode for carrying out the present disclosure has been described so far; however, the present disclosure can be carried out in variously modified modes without being limited to the above-described embodiment.

3-1. First Modified Embodiment

In the above-described embodiment, the third body diode D3 is between the first switch circuit SWA1 and the connection point PX on the first current path LA1. However, the third body diode D3 may be arranged anywhere on the first current path LA1. For example, the third body diode D3 may be between the first battery pack 30A and the first switch circuit SWA1 on the first current path LA1.

In such a case in which the third body diode D3 is between the first battery pack 30A and the first switch circuit SWA1 on the first current path LA1, too, the third switch Q3 may be connected in parallel with the third body diode D3. That is, two ends of the third body diode D3 may be able to be short-circuited.

Similarly, the fourth body diode D4 may be between the second battery pack 30B and the second switch circuit SWB1 on the second current path LB1. In this case, too, the fourth switch Q4 may be connected in parallel with the fourth body diode D4. That is, two ends of the fourth body diode D4 may be able to be short-circuited.

3-2. Second Modified Embodiment

In the above-described embodiment, a process of switching the power supply path from the first current path LA1 to the second current path LB1 has been described with reference to the flowcharts of FIGS. 4 through 6 and the time chart of FIG. 7.

The power supply path can also be switched form the second current path LB1 to the first current path LA1 in a manner similar to that of the above-described embodiment. In such a case, effects similar to those of the above-described embodiment can be obtained.

Specifically, from the second steady state, the fourth switch circuit SWB2 is first switched to the OFF-state. Then, the first switch circuit SWA1 is switched to the ON-state. Next, the second switch circuit SWB1 is switched to the OFF-state. Lastly, the third switch circuit SWA2 is switched to the ON-state. In this way, the power supply path is switched from the second current path LB1 to the first current path LA1.

When switching the power supply path from the second current path LB1 to the first current path LA1, the second detection switch SWb may be maintained in the ON-state. Then, the fourth voltage value may be detected by the third voltage detector 90. In this way, failure diagnosis on the fourth switch circuit SWB2 can be performed through a process similar to that of the above-described embodiment.

3-3. Third Modified Embodiment

In the above-described embodiment, in the process of switching of the power supply path from the second current path LB1 to the first current path LA1, the first switch circuit SWA1 is switched to the OFF-state, and then, the fourth switch circuit SWB2 is switched to the ON-state. However, this order may be reversed. Alternatively, switching of the first switch circuit SWA1 to the OFF-state may be performed concurrently with switching of the fourth switch circuit SWB2 to the ON-state.

3-4. Fourth Modified Embodiment

Figure 8:
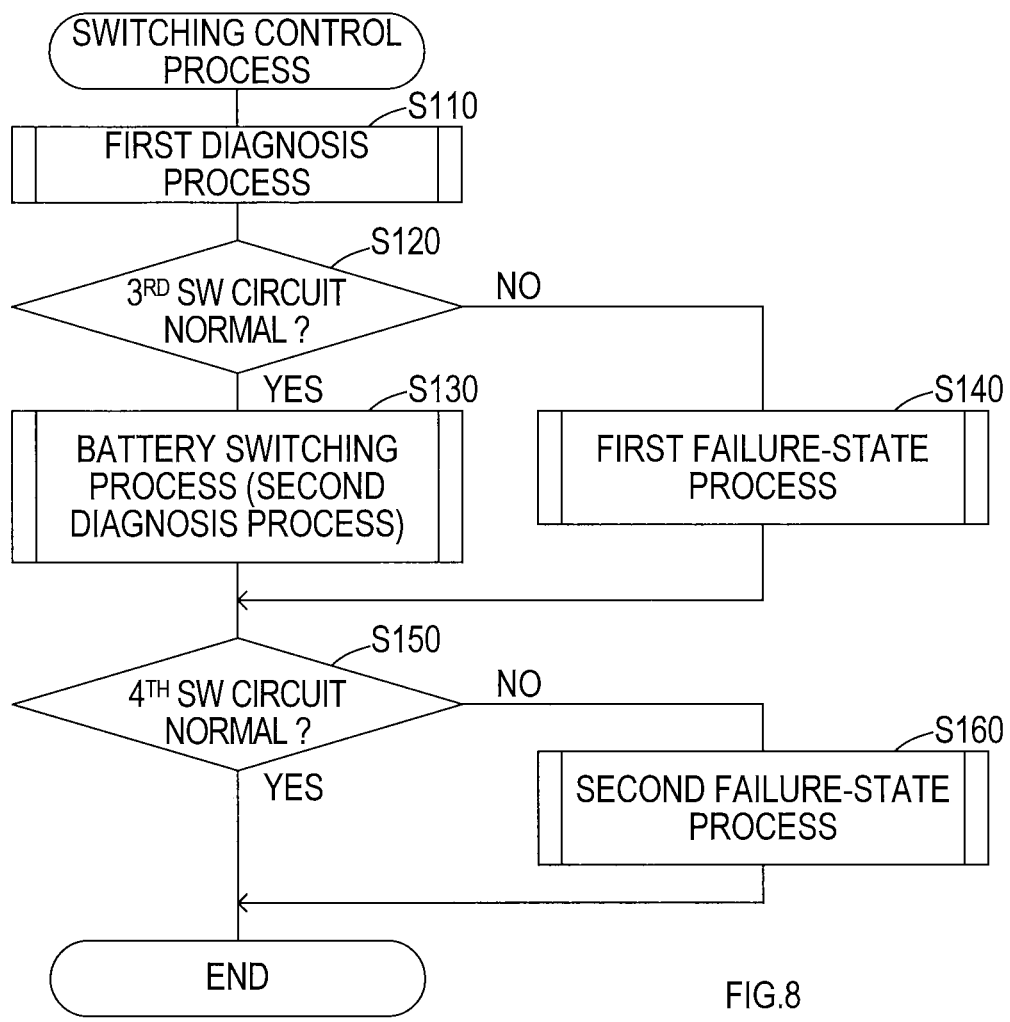
FIG. 8 is a flowchart showing a switching control process of a fourth modified embodiment.

In the above-described embodiment, before switching the power supply path from the first current path LA1 to the second current path LB1, the power-supply management control circuit 80 performs the failure diagnosis on the third switch circuit SWA2. In addition, failure diagnosis on the fourth switch circuit SWB2 may be performed. Specifically, as shown in FIG. 8, a second diagnosis process may be performed in the battery switching process of S130, for example. The second diagnosis process includes the failure diagnosis on the fourth switch circuit SWB2.

In this case, as shown in FIG. 8, whether the fourth switch circuit SWB2 is normal may be determined in S150. If it is determined that the fourth switch circuit SWB2 is not normal, a second failure-state process may be performed in S160. The second failure-state process may be performed in a manner, for example, similar to that of the first failure-state process of S140.

Performing the switching control process illustrated in FIG. 8 results in performing the failure determination on the fourth switch circuit SWB2 as well as the failure determination on the third switch circuit SWA2.

Figure 9:
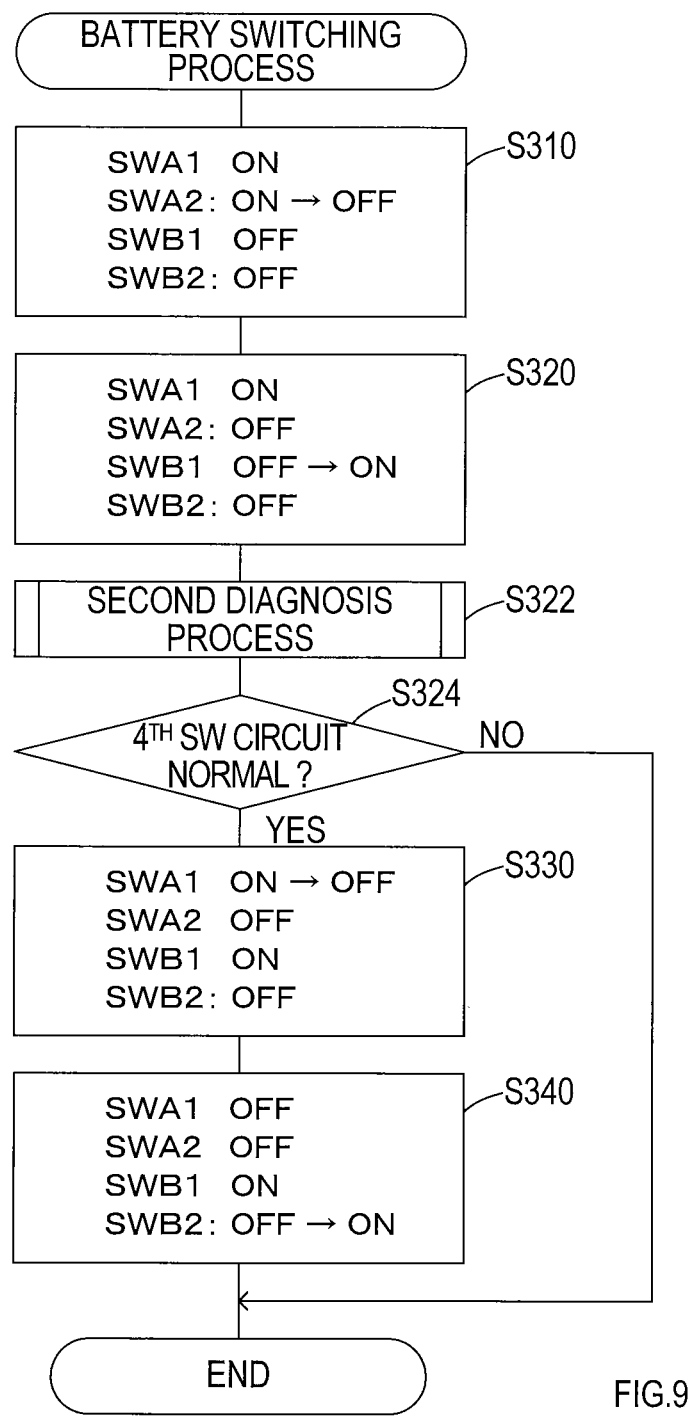
FIG. 9 is a flowchart showing a battery switching process of the fourth modified embodiment.

The second diagnosis process of S130 may be performed as shown in FIG. 9, for example. Specifically, the second diagnosis process may be performed in S322 after the process of S320 is performed.

After the process of S320, the first switch circuit SWA1 and the second switch circuit SWB1 are maintained in the ON-state, and the third switch circuit SWA2 and the fourth switch circuit SWB2 are maintained in the OFF-state.

Figure 10:
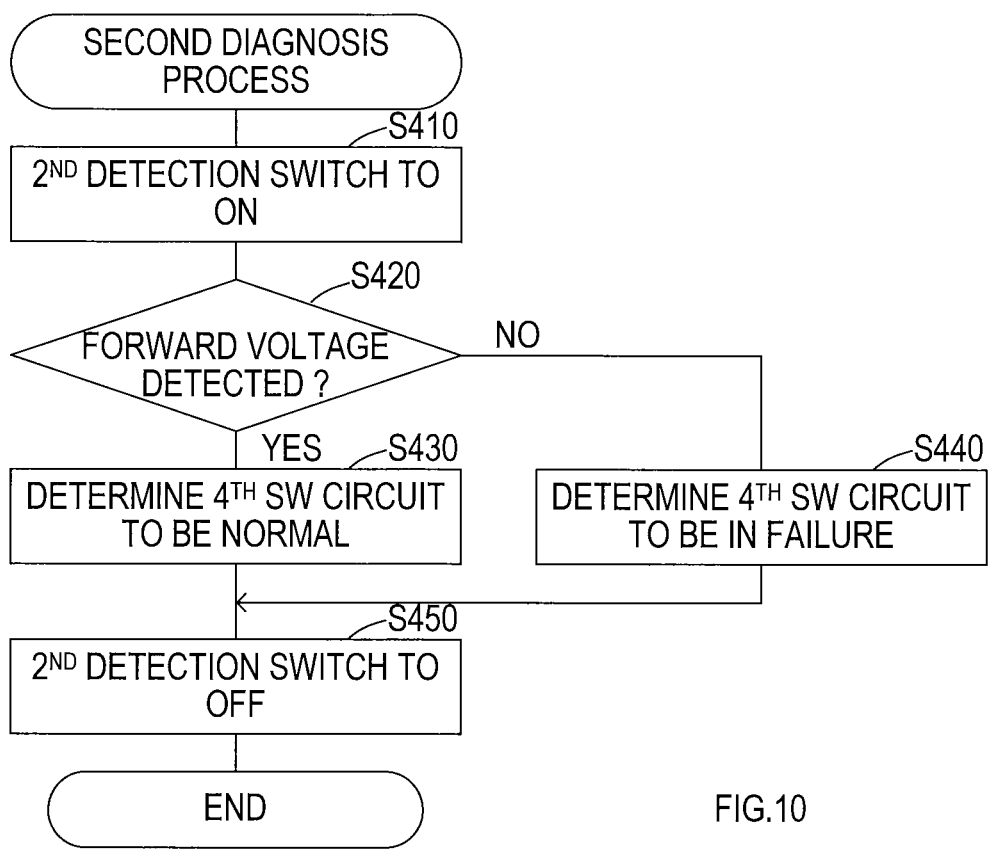
FIG. 10 is a flowchart showing a second diagnosis process of the fourth modified embodiment.

Thus, in the second diagnosis process of S322, as shown in FIG. 10, the second detection switch SWb is switched to the ON-state in S410. This results in applying the fourth voltage to the third voltage detector 90.

In this case, if the fourth switch circuit SWB2 is in the OFF-state, a load current flows through the fourth body diode D4. Thus, a specific forward voltage is detected by the third voltage detector 90.

However, if the fourth switch circuit SWB2 is in failure (e.g., short-circuited), little or no load current flows through the fourth body diode D4. Thus, the fourth voltage is zero or extremely lower than the forward voltage.

Thus, in the second diagnosis process, in subsequent S420, whether the specific forward voltage is detected in the fourth body diode D4 is determined based on the magnitude of the fourth voltage detected by the third voltage detector 90. Specifically, the power-supply management control circuit 80 may determine that the specific forward voltage is generated in the fourth body diode D4 when the magnitude of the fourth voltage is greater than or equal to a second threshold. The second threshold may be determined to be any value. The second threshold may be determined similarly to the first threshold. The second threshold may be equal to the first threshold.

If it is determined in S420 that the specific forward voltage is detected, it is determined in S430 that the fourth switch circuit SWB2 is normal. If the specific forward voltage is not detected in S420, it is determined in S440 that the fourth switch circuit SWB2 (more specifically, the fourth switch Q4) is in failure. In S450, the second detection switch SWb is switched back to the OFF-state.

Performing the second diagnosis process of S322 makes it possible to perform the failure diagnosis on the fourth switch circuit SWB2 during the switching control process. Further, if it is determined that the fourth switch circuit SWB2 is in failure in this failure diagnosis, driving of the respective motors 31 to 36 is inhibited or stopped, and the user is notified accordingly. Thus, the safety of the control system 50 can be enhanced.

3-5. Fifth Modified Embodiment

The dust collector 1 of the above-described embodiment includes "Configuration Related to First Feature" and "Configuration Related to Second Feature" described above.

In the present disclosure, however, only one of "Configuration Related to First Feature" and "Configuration Related to Second Feature" may be included. In particular, a specific form of battery-operated device described below may be provided, for example.

In particular, the specific form of battery-operated device may include:
- a drive circuit configured to drive an electric load (or a driven object);
- an attachment portion configured to be attached with a battery pack in a detachable manner;
- a discharge path configured to allow supply of a direct-current power from the battery pack attached to the attachment portion to the drive circuit;
- a main switch (i) on the discharge path and (ii) configured to complete or interrupt the discharge path;
- a rectifying device (i) on the discharge path and (ii) configured to inhibit or prevent an electric current from flowing from the drive circuit to the battery pack through the discharge path;
- an auxiliary switch (i) electrically connected to the discharge path (e.g., connected in parallel with the rectifying device) so as to bypass the rectifying device and (ii) configured to short-circuit two ends of the rectifying device;
- a control circuit configured to control an ON-state and an OFF-state of each of the main switch and the auxiliary switch; and
- a voltage detection circuit configured to detect a voltage across the rectifying device.

the control circuit may be configured to:
- switch each of the main switch and the auxiliary switch to an ON-state, to thereby allow supply of the direct-current power from the battery pack to the drive circuit,
- switch the auxiliary switch to an OFF-state based on a specific requirement having been satisfied, to thereby acquire a magnitude of the voltage detected by the voltage detection circuit, and
- determine whether the auxiliary switch is in failure based on the acquired magnitude of the voltage.

In this specific form of battery-operated device, the rectifying device prevents reverse flow of the electric current to the battery pack. Moreover, switching the auxiliary switch to the ON-state results in reducing the electric current flowing through the rectifying device, thus enabling inhibition of deterioration or failure of the rectifying device.

In the above-described specific form of battery-operated device, the main switch corresponds to the first switch circuit SWA1 of the above-described embodiment, and the auxiliary switch corresponds to the third switch circuit SWA2 of the above-described embodiment. The discharge path may include the first current path LA1 and the second current path LB1 similarly to the above-described embodiment. Further, in this case, the main switch and the auxiliary switch may be provided to each of the first and second current paths LA1 and LB1. In this case, in each of the first and second current paths LA1 and LB1, reverse flow of the electric current to the battery pack is inhibited.

Moreover, the specific form of battery-operated device may further include "Configuration Related to Second Feature". In this case, failure diagnosis on the auxiliary switch can be performed.

OTHER EMBODIMENTS

The first to fourth switches Q1 to Q4 may be any semiconductor switches as long as they can complete or interrupt the corresponding discharge paths. One or more of the first to fourth switches Q1 to Q4 may have a form of, for example, a MOSFET of a p-channel type. One or more of the first to fourth switches Q1 to Q4 may have a form of, for example, a bipolar transistor.

In the above-described embodiment, the dust collector 1 has been illustrated as one example of the battery-operated device of the present disclosure. However, the present disclosure is applicable to any battery-operated device capable of operating by receiving power supply from the battery pack. For example, the technology of the present disclosure is applicable to various battery-operated devices, such as a reinforcing bar binder, a lawn mower, a wheelbarrow, a cooler/warmer box, and a lighting device.

Two or more functions of a single element in the above-described embodiments may be performed by two or more elements, and a single function of a single element may be performed by two or more elements. Two or more functions performed by two or more elements may be performed by a single element, and a single function performed by two or more elements may be performed by a single element. Part of the configuration in the above-described embodiments may be omitted. At least a part of the configuration in the above-described embodiments may be added to or replace another configuration in the above-described embodiments. Any and all modes encompassed by the technical idea specified only by the language of the claims are embodiments of the present disclosure.

The technology of the present disclosure can be embodied not only as the battery-operated device, but also can be embodied in various forms, such as a control system for various battery-operated devices, a program to cause a computer to perform the above-described various controls, a non-transitory tangible recording medium, such as a semiconductor memory, on which such a program is recorded, and a method for controlling the battery-operated device.

What is claimed is:

1. A battery-operated device comprising:
a first attachment portion and a second attachment portion configured to be respectively attached with a first battery pack and a second battery pack in a detachable manner, the first battery pack and the second battery pack respectively including a first battery and a second battery, the first battery and the second battery respectively including a first positive electrode and a second positive electrode;
a first positive-electrode terminal configured to be electrically connected to the first positive electrode of the first battery pack attached to the first attachment portion;
a second positive-electrode terminal configured to be electrically connected to the second positive electrode of the second battery pack attached to the second attachment portion;
first to fourth current paths each including a first end and a second end, the first end of the first current path being electrically connected to the first positive-electrode terminal, the first end of the second current path being electrically connected to the second positive-electrode terminal, the second end of the second current path being electrically connected to the second end of the first current path, the first end of the third current path being electrically connected to the first positive-electrode terminal, the first end of the fourth current path being electrically connected to the second positive-electrode terminal, the second end of the fourth current path being electrically connected to the second end of the third current path;
a first switch (i) on the first current path and (ii) configured to be switched between an ON-state and an OFF-state, the first switch in the ON-state being configured to complete the first current path, the first switch in the OFF-state being configured to interrupt the first current path;
a second switch (i) on the second current path and (ii) configured to be switched between an ON-state and an OFF-state, the second switch in the ON-state being configured to complete the second current path, the second switch in the OFF-state being configured to interrupt the second current path;
a first power-supply circuit electrically connected to the second end of the first current path and to the second end of the second current path, the first power-supply circuit being configured to receive (i) a first electric power from the first battery via the first current path or (ii) a second electric power from the second battery via the second current path, the first power-supply circuit including a voltage regulator, the voltage regulator being configured to (i) generate a first voltage based on the first electric power or the second electric power and (ii) output the first voltage;
a second power-supply circuit electrically connected to the second end of the third current path and to the second end of the fourth current path, the second power-supply circuit being configured to receive (i) a third electric power from the first battery via the third current path or (ii) a fourth electric power from the second battery via the fourth current path, the second power-supply circuit being configured to (i) generate a second voltage based on the third electric power or the fourth electric power and (ii) output the second voltage;
a first control circuit configured to (i) receive the first voltage from the first power-supply circuit and (ii) operate with the first voltage;
a second control circuit configured to (i) receive the second voltage from the second power-supply circuit and (ii) operate with the second voltage;
a first rectifier on the third current path, the first rectifier being configured to (i) allow a first electric current to flow through the third current path from the first end of the third current path to the second end of the third current path and (ii) inhibit or prevent a second electric current from flowing through the third current path from the second end of the third current path to the first end of the third current path; and
a second rectifier on the fourth current path, the second rectifier being configured to (i) allow a third electric current to flow through the fourth current path from the first end of the fourth current path to the second end of the fourth current path and (ii) inhibit or prevent a fourth electric current from flowing through the fourth current path from the second end of the fourth current path to the first end of the fourth current path.

2. The battery-operated device according to claim 1, further comprising:
a drive circuit (i) electrically connected to the second end of the first current path and to the second end of the second current path and (ii) configured to drive an electric load.

3. The battery-operated device according to claim 1, wherein
the second control circuit is electrically connected to the first switch and to the second switch, and
the second control circuit is configured to individually switch the first switch and the second switch to the ON-state or to the OFF-state.

4. The battery-operated device according to claim 1, further comprising:
a third rectifier on the first current path, the third rectifier being configured to (i) allow a fifth electric current to flow through the first current path from the first end of the first current path to the second end of the first current path via the third rectifier and (ii) inhibit or prevent a sixth electric current from flowing through the first current path from the second end of the first current path to the first end of the first current path via the third rectifier; and
a fourth rectifier on the second current path, the fourth rectifier being configured to (i) allow a seventh electric current to flow through the second current path from the first end of the second current path to the second end of the second current path via the fourth rectifier and (ii) inhibit or prevent an eighth electric current from flowing through the second current path from the second end of the second current path to the first end of the second current path via the fourth rectifier.

5. The battery-operated device according to claim 4, further comprising:
a third switch (i) electrically connected to the first current path so as to bypass the third rectifier and (ii) configured to be switched between an ON-state and an OFF-state, the third switch in the ON-state being configured to allow the fifth electric current to flow through the third switch, the third switch in the OFF-state being configured to inhibit or prevent the sixth electric current from flowing through the third switch; and
a fourth switch (i) electrically connected to the second current path so as to bypass the fourth rectifier and (ii)

configured to be switched between an ON-state and an OFF-state, the fourth switch in the ON-state being configured to allow the seventh electric current to flow through the fourth switch, the fourth switch in the OFF-state being configured to inhibit or prevent the eighth electric current from flowing through the fourth switch.

6. The battery-operated device according to claim 5, wherein
the second control circuit is electrically connected to the first to fourth switches, and
the second control circuit is configured to:
(i) switch the first switch and the third switch to their respective ON-states and (ii) switch the second switch and the fourth switch to their respective OFF-states, to thereby set the battery-operated device to a first steady state;
switch the third switch to the OFF-state based on the battery-operated device being in the first steady state, to thereby set the battery-operated device to a first transient state; and
switch the second switch to the ON-state based on the battery-operated device being in the first transient state, to thereby set the battery-operated device to a second transient state.

7. The battery-operated device according to claim 6, wherein
the second control circuit is configured to set the battery-operated device to the first transient state based on (i) the battery-operated device being in the first steady state and (ii) a switching requirement having been satisfied or being satisfied, and
the switching requirement is required for supplying the second electric power to the first power-supply circuit.

8. The battery-operated device according to claim 6, wherein
the second control circuit is configured, based on the battery-operated device being in the second transient state, to (i) switch the first switch to the OFF-state and (ii) switch the fourth switch to the ON-state, to thereby set the battery-operated device to a second steady state.

9. The battery-operated device according to claim 6, wherein
the second control circuit is configured to output a first OFF signal to the third switch,
the third switch is configured to be switched to the OFF-state based on the third switch having received the first OFF signal,
the second control circuit is configured to perform a first diagnosis, and
the first diagnosis includes:
acquiring a magnitude of a third voltage across the third switch based on the first OFF signal having been output or being output to the third switch; and
performing a first operation based on the magnitude of the third voltage acquired.

10. The battery-operated device according to claim 9, further comprising:
a drive circuit (i) electrically connected to the second end of the first current path and to the second end of the second current path and (ii) configured to drive an electric load, wherein
the first operation includes limiting or stopping driving of the electric load by the drive circuit based on the magnitude of the third voltage being smaller than a first threshold.

11. The battery-operated device according to claim 9, wherein
the second control circuit is configured to perform the first diagnosis during a period when the battery-operated device is in the first steady state, and
the first diagnosis includes outputting the first OFF signal to the third switch.

12. The battery-operated device according to claim 11, wherein
the first diagnosis further includes outputting a first ON signal to the third switch based on the magnitude of the third voltage having been acquired, and
the third switch is configured to be switched to the ON-state based on the third switch having received the first ON signal.

13. The battery-operated device according to claim 6, wherein
the second control circuit is configured to output a second OFF signal to the fourth switch,
the fourth switch is configured to be switched to the OFF-state based on the fourth switch having received the second OFF signal,
the second control circuit is configured to perform a second diagnosis, and
the second diagnosis includes:
acquiring a magnitude of a fourth voltage across the fourth switch based on the second OFF signal having been output or being output to the fourth switch; and
performing a second operation based on the magnitude of the fourth voltage acquired.

14. The battery-operated device according to claim 13, further comprising:
a drive circuit (i) electrically connected to the second end of the first current path and to the second end of the second current path and (ii) configured to drive an electric load, wherein
the second operation includes limiting or stopping driving of the electric load by the drive circuit based on the magnitude of the fourth voltage being smaller than a second threshold.

15. The battery-operated device according to claim 13, wherein
the second control circuit is configured to perform the second diagnosis during a period when the battery-operated device is in the second transient state.

16. The battery-operated device according to claim 5, wherein
the third switch (i) is a field-effect transistor and (ii) includes a third body diode corresponding to the third rectifier, and/or
the fourth switch (i) is a field-effect transistor and (ii) includes a fourth body diode corresponding to the fourth rectifier.

17. The battery-operated device according to claim 4, wherein
the third rectifier is electrically connected to the first end of the first current path via the first switch,
the first switch is electrically connected to the second end of the first current path via the third rectifier,
the fourth rectifier is electrically connected to the first end of the second current path via the second switch, and
the second switch is electrically connected to the second end of the second current path via the fourth rectifier.

18. The battery-operated device according to claim 1, wherein
the first switch (i) is a field-effect transistor and (ii) includes a first body diode, the first body diode including a cathode electrically connected to the first positive-electrode terminal, and/or
the second switch (i) is a field-effect transistor and (ii) includes a second body diode, the second body diode including a cathode electrically connected to the second positive-electrode terminal.

19. The battery-operated device according to claim 1, further comprising:
a power distribution path including (i) an input end electrically connected to the second end of the first current path and the second end of the second current path, (ii) a first output end, and (iii) a second output end, the input end being configured to (i) receive a first battery power from the first battery via the first current path, or (ii) receive a second battery power from the second battery via the second current path, the power distribution path being configured to (i) distribute the first battery power to the first output end and the second output end, or (ii) distribute the second battery power to the first output end and the second output end; and
a drive circuit (i) electrically connected to the second output end of the power distribution path, (ii) configured to receive a first driving power or a second driving power from the second output end, and (iii) configured to drive an electric load based on the first driving power or the second driving power, the first driving power corresponding to a first portion of the first battery power distributed to the second output end in the power distribution path, the second driving power corresponding to a first portion of the second battery power distributed to the second output end in the power distribution path, wherein
the first power-supply circuit is (i) electrically connected to the first output end of the power distribution path, and (ii) configured to receive the first electric power or the second electric power from the first output end,
the first electric power corresponds to a second portion of the first battery power distributed to the first output end in the power distribution path, and
the second electric power corresponds to a second portion of the second battery power distributed to the first output end in the power distribution path.

\* \* \* \* \*